(12) United States Patent
Yang et al.

(10) Patent No.: US 10,977,643 B2
(45) Date of Patent: Apr. 13, 2021

(54) METHODS, DEVICES AND SYSTEMS FOR ACQUIRING SERVICE, EXECUTING OPERATION, AND TRANSMITTING INFORMATION

(71) Applicant: BANMA ZHIXING NETWORK (HONGKONG) CO., LIMITED, Kowloon (HK)

(72) Inventors: Chunsong Yang, Hangzhou (CN); Zhijun Yuan, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 328 days.

(21) Appl. No.: 15/912,419

(22) Filed: Mar. 5, 2018

(65) Prior Publication Data

US 2018/0260807 A1    Sep. 13, 2018

Related U.S. Application Data

(63) Continuation-in-part of application No. PCT/CN2016/097269, filed on Aug. 30, 2016.

(30) Foreign Application Priority Data

Sep. 8, 2015  (CN) .......................... 201510566164.5

(51) Int. Cl.
*G06Q 40/06*       (2012.01)
*G06Q 20/32*       (2012.01)
(Continued)

(52) U.S. Cl.
CPC ......... *G06Q 20/3276* (2013.01); *G06Q 20/18* (2013.01); *G06Q 20/3278* (2013.01);
(Continued)

(58) Field of Classification Search
CPC .... G06Q 40/00; G06Q 20/18; G06Q 20/3278; G06Q 30/0601; G07F 11/00; G07F 13/065
See application file for complete search history.

(56) References Cited

U.S. PATENT DOCUMENTS

2007/0073585 A1*  3/2007  Apple ................... G06Q 40/00
                                                         705/14.46
2007/0118284 A1*  5/2007  Sposato ................. G01C 21/20
                                                         701/469
(Continued)

FOREIGN PATENT DOCUMENTS

CN    103971460 A    8/2014
CN    203982449 U   12/2014
(Continued)

OTHER PUBLICATIONS

Lakshmisha Honnegowda, Syin Chan, and Chiew Tong Lau, Security Enhancement for Magnetic Data Transaction in Electronic Payment and Healthcare Systems, Apr. 2013, IACSIT International Journal of Engineering and Technology, vol. 5, pp. 332-335 (Year: 2013).*

*Primary Examiner* — I Jung Liu
(74) *Attorney, Agent, or Firm* — Van Pelt, Yi & James LLP

(57) ABSTRACT

Embodiments of the present application relate to a method, device, and system for obtaining service, executing operations, and offline physical equipment-based information transmission. The method includes obtaining, by a terminal, identifying information associated with a provision device, communicating, by the terminal, the identifying information to an identifying information receiver, obtaining, by the terminal, provision information associated with the provision device, wherein the provision information is obtained as feedback by the identifying information receiver based on
(Continued)

the identifying information, and wherein the provision information is indicative of at least one service or one product provided by the provision device, and providing, by the terminal, at least a subset of the provision information associated with the provision device to a user of the terminal.

18 Claims, 10 Drawing Sheets

(51) Int. Cl.
| | |
|---|---|
| *G07F 11/00* | (2006.01) |
| *G07F 13/06* | (2006.01) |
| *G06Q 20/18* | (2012.01) |
| *G06Q 30/06* | (2012.01) |
| *G06K 7/14* | (2006.01) |
| *G06K 7/10* | (2006.01) |

(52) U.S. Cl.
CPC ......... *G06Q 30/0601* (2013.01); *G07F 11/00* (2013.01); *G07F 13/065* (2013.01); *G06K 7/1417* (2013.01); *G06K 2007/10524* (2013.01)

(56) References Cited

U.S. PATENT DOCUMENTS

2014/0159869 A1* 6/2014 Zumsteg ................ G07G 1/009
340/10.1
2015/0182160 A1* 7/2015 Kim ..................... A61B 5/4519
600/301

FOREIGN PATENT DOCUMENTS

| CN | 204537228 U | 8/2015 |
| WO | 2012037934 A1 | 3/2012 |
| WO | 2012163646 A1 | 12/2012 |

* cited by examiner

METHODS, DEVICES AND SYSTEMS FOR ACQUIRING SERVICE, EXECUTING OPERATION, AND TRANSMITTING INFORMATION

CROSS REFERENCE TO OTHER APPLICATIONS

This application is a continuation-in-part of and claims priority to International (PCT) Application No. PCT/CN2016/097269 filed on Aug. 30, 2016, which claims priority to People's Republic of China Patent Application No. 201510566164.5 entitled METHOD, DEVICE AND SYSTEM FOR OBTAINING SERVICE, EXECUTING OPERATIONS, AND TRANSMITTING INFORMATION, filed Sep. 8, 2015, which is incorporated herein by reference for all purposes.

FIELD OF THE INVENTION

The present application relates to a field of computer technology. In particular, the present application relates to a method, device, and system for obtaining service, executing operations, and communicating with a provision device.

BACKGROUND OF THE INVENTION

According to related art, a user can purchase a product provided by offline equipment through a terminal (such as a smart phone). In order to obtain such services, the user is generally required to physically approach the offline equipment and, by operating the offline equipment and performing operations on the operating panel of the offline equipment, select the item (such as the product the user wishes to purchase) provided by the offline equipment. Moreover, after completing the selection operation and as prompted by the offline terminal, the user is generally required to use another terminal (e.g., a smart phone) to scan a payment Quick Response (QR) code displayed by the offline terminal. After scanning the payment QR code, the user is able to complete the payment operation and thus obtain the corresponding item. The item may, for example, be the following: after payment is completed, the offline physical equipment pushes the user-purchased product to a pick-up window.

The problem with the above-described method for obtaining service is that obtaining items from offline terminals involves many steps, is tedious, and relatively inefficient. Accordingly, consumers may be less likely to consume services from such offline terminals.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation of the present application. Among the drawings.

DETAILED DESCRIPTION

Figure 1:
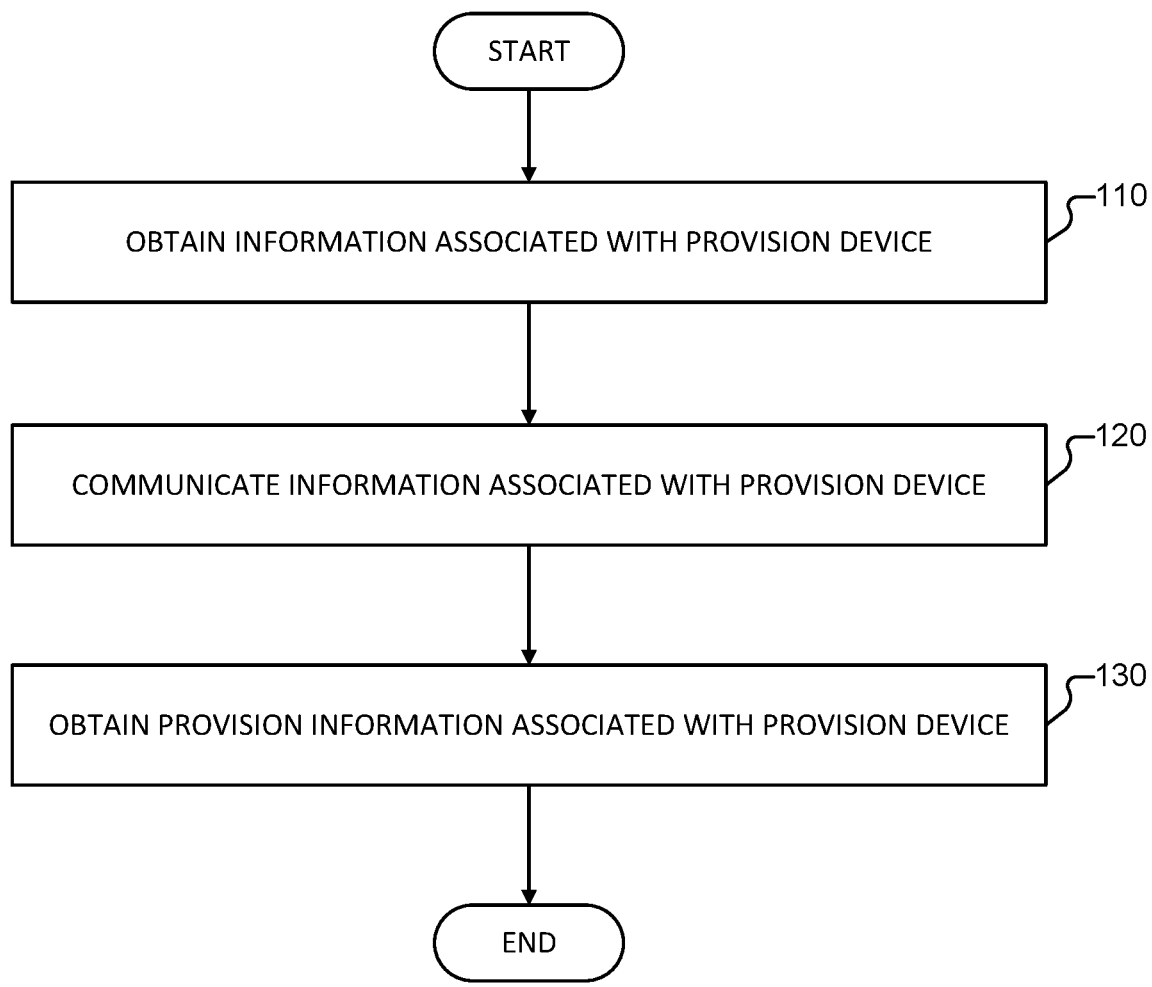
FIG. 1 is a flowchart of a method for obtaining service at a terminal side according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So as to further clarify the objectives, technical schemes, and advantages of the present application, technical schemes of the present application are described clearly and completely below in light of specific embodiments and corresponding drawings of the present application. Obviously, the embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, an information centers (such as one or more services providing information such as traffic or weather, etc.) a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

In some embodiments, a provision device is a terminal that is connected to one or more networks. The provision device can be a physical device or equipment, such as a kiosk from which a product or service can be obtained by a user, a vending machine, etc. In some embodiments, a provision device provides a product or service to a user or to a terminal used by the user (e.g., a smart terminal). The provision device is not connected to a network to which the terminal used by the user is connected.

FIG. 1 is a flowchart of a method for obtaining service at a terminal side according to various embodiments of the present disclosure.

Referring to FIG. 1, process 100 is provided. Process 100 can be implemented in connection with interface 200 of FIG. 2A, interface 230 of FIG. 2B, interface 260 of FIG. 2C, interface 300 of FIG. 3A, interface 350 of FIG. 3B, process 400 of FIG. 4, and/or process 500 of FIG. 5. Process 100 can be implemented at least in part by system 600 of FIG. 6, and/or computer system 700 of FIG. 7. Process 100 can be implemented by a terminal such as a terminal that is in proximity to a provision device or that is in communication with the provision device.

At 110, information associated with a provision device is obtained. In some embodiments, a smart terminal obtains the information associated with the provision device. The smart terminal can be operated by a user. For example, the user can use a smart terminal in connection with obtaining the information associated with the provision device. The user can obtain the information associated with the provision device in connection with operating the provision device (e.g., in connection with obtaining a product and/or service from the provision device). According to various embodiments, the information associated with the provision device comprises identifying information that identifies the provision device, configuration information for the provision device, location information for the provision device, etc. Identifying information that identifies the provision device can include a Media Access Control (MAC) address, a serial number, a model number, a version number, a unique identifier, equipment number, etc. The identifying information uniquely identifies the provision device (universally or within a network or set of terminals such as a set of terminals owned by a company, etc.).

The information associated with the provision device can be obtained based on a wireless signal, an image, etc. In some embodiments, the terminal obtains identifying information via a wireless signal communicated over Bluetooth, infrared, WiFi, Near Field Communications (NFC), etc. The identifying information can be broadcast from the provision device (e.g., across a network to which the provision device is communicated, or within a physical proximity of the provision device). The terminal used by the user can scan for a broadcast or a communication of the information associated with the provision device. In some embodiments, the information associated with the provision device can be obtained by scanning an object such as a QR code, a bar code, an identifier such as a serial number or equipment number, an image, etc. A terminal used by the user (e.g., a smart terminal such as a smart phone) can scan the object via an image capture such as by use of a camera on the terminal.

At 120, the information associated with the provision device is communicated. For example, the terminal that obtained the information associated with the provision device. The terminal can communicate the information associated with the provision device (e.g., the identifying information) to an identifying information receiver. The identifying information receiver can be a server which communicates with the terminal via one or more networks such as the Internet. The information associated with the provision device can be communicated in response to the information associated with a provision device being obtained. For example, a user can use a smart phone to scan a quick response (QR) code of the provision device to obtain an identifier of the provision device, or the smart phone can obtain the identifier of the provision device via a connection with the provision device via a wireless connection such as Bluetooth, WiFi, etc.

In some embodiments, the terminal executes an application that obtains the information associated with the provision device, and the application communicates the information associated with the provision device to the identifying information receiver. As an example, the terminal can launch the application in response to user selection (e.g., the user selecting an icon on a user interface, etc.). As another example, the terminal can run an application or module in the background (e.g., during normal operation) and search for the presence of a provision device such as by detecting a broadcast from the provision device, and in response to detecting the provision device (e.g., within a threshold proximity of the terminal), the terminal can alert the user of the presence of the provision device.

In some embodiments, the provision device is configured for direct exchange of information with terminals (e.g., smart terminals such as a smart phone operated by a user wishing to interact with the provision device). In another approach, the provision device exchanges information with terminals by communicating with the identifying information receiver. For example, identifying information receiver serve as an intermediary between the terminal and the provision device. In this case, the terminal sends the identifying information to the identifying information receiver. Therefore, in some embodiments, the identifying information receiver is a provision device or a server.

In some embodiments, a plurality of provision devices are distributed within a predefined area. The plurality of provision devices can be associated with the same service (e.g., the plurality of provision devices can be owned and/or operated by an organization such as a business that provides services or that sells products). If a terminal is located within the predefined area, then the terminal will receive the identifying information for at least a subset of the plurality of provision devices. For example, the terminal can receive identifying information for each of the plurality of provision devices within the predefined area. To avoid confusion relating to information transmissions, the terminal will, after determining (e.g., selecting) the provision device from which service is to be obtained, send the identifying information of the provision device to the identifying information receiver. The terminal can provide to the user a list of one or more available provision devices, and the terminal can receive an input from the user with respect to a desired provision device. The terminal can select the provision device from which service is to be obtained based on a user input, user preferences, etc. For example, in response to determining that a plurality of provision devices are distributed within the predefined area (or that information associated with a plurality of provision devices is available or communicated to the terminal), the terminal provides an indication to a user (e.g., an alert to the user). The terminal can provide to the user (via a user interface) a list of the provision devices for which identifying information is available and/or obtained. The terminal can prompt the user to select a desired provision device (e.g., a provision device from which the user desires a service), and the terminal can receive a user selection of the desired terminal. In some embodiments, the terminal selects the provision device from which service is to be obtained based at least in part on a distance of the provision device from the terminal (e.g., the closest provision device can be selected). In some embodiments, two or more of the plurality of provision devices within the predefined area are selected as provision devices from which service is to be obtained.

In some embodiments, the terminal sends a request for provision information associated with the provision device from which service is to be obtained. The communicating of information associated with the provision device comprises communicating the request for provision information. For example, in response to determining the provision device from which service is to be obtained, the terminal sends the request for provision information. The request for provision information can be communicated in connection with the identifying information of the provision device. Specifically, the request for provision information can comprise the identifying information for the offline physical equipment. In some embodiments, the request for provision information comprises the name, IP, and other information of the terminal itself. The request for provision information can be used to indicate that the terminal has made a request to connect with the provision device and obtain a corresponding service.

At 130, provision information associated with the provision device is obtained. For example, the provision information associated with the provision device is obtained by the terminal. The provision information can comprise product information, price, traffic information, etc. The terminal can receive the provision information in response to a server or other identifying information receiver receiving the request for provision information. The server or other identifying information receiver can store mappings of provision information to identifying information of provision devices, and based on the request for provision information, determine the provision information corresponding to the identifying information that is communicated in connection with the request for provision information. The obtained provision information corresponds to the provision device associated with the identifying information. The terminal can obtain service from the provision device associated with the identifying information based at least in part on the provision information. For example, in response to obtaining the provision information, the terminal uses the provision information in connection with obtaining a product or service from the corresponding provision device. The user can select a product (e.g., provided in the service information), and purchase the product, and obtain the product from the provision device.

The identifying information receiver can use the identifying information as a basis for accurately acquiring provision information of the provision device corresponding to the identifying information. Thus, the identifying information receiver communicates the provision information as feedback to the terminal. The provision information given as feedback by the identifying information receiver may be considered as the provision information in the provision device that the terminal wants to look up. Accordingly, the terminal receives the provision information corresponding to the provision device that is communicated by the identifying information receiver.

Provision information can comprise information indicative of one or more services or products provided by the provision device. For example, the provision information can comprise one or more identifiers that specify the one or more services or products provided by the provision device. As another example, the provision information can comprise one or more identifiers from which the terminal can determine the one or more services or products provided by the provision device. For example, the terminal can query (or perform a lookup in) a mapping of identifiers to products and services to determine the one or more products and services offered. Accordingly, the user can learn of the various kinds of service items (e.g., services and/or products) which the provision device provides. In some embodiments, the provision information includes configuration information that is indicative of a configuration or setting of the provision device. Provision information can include equipment information of the corresponding provision device. For example, the provision information can include equipment information comprising position information, operating status, name, provided types of services or products, an image of the provision device, and other such information. Provision information can comprise an indication of a type of a product or service, a price of a product or service, an amount of a product or service, information relating to traffic or weather, etc.

The user can determine one or more services or products provided by the provision device without having to actively approach the provision device and operate an operating panel (e.g., a touchscreen, a keypad, etc.) provided by the provision device and without having to actively use a terminal to scan a QR code displayed by the provision device. Thus, the process of determining one or more services or products provided by the provision device, and obtaining the one or more services or products provided by the provision device is more convenient and efficient than related art.

In some embodiments, the one or more services or products provided by the provision device are immediate. For example, the user can obtain the one or more services or products provided by the provision device contemporaneous with payment for such one or more services or products (e.g., immediately after making payment). As an example, if the user purchases merchandise in the provision device, the user can immediately obtain the merchandise (e.g., from the provision device).

Various embodiments provide a seamless process for enabling a user to perform a payment operation and obtain a service or product from a provision device. For example, in connection with the user performing the payment operation and obtaining the service or product, the provision device can broadcast information associated with the provision device. The provision device can broadcast identifying information associated with the provision device via a short-distance communication. The terminal can scan for information associated with provision devices that is being communicated. For example, the terminal can scan for identifying information broadcast by one or more provision devices (e.g., within proximity of the terminal). The terminal can scan for identifying information being communicated in response to a user selection, or in connection with a background process running on the terminal. If the provision device broadcasts the identifying information via a short-distance communication (e.g., Bluetooth, NFC, infrared, etc.), the terminal will receive wireless signals from the provision device when the terminal is within the effective range of the corresponding short-distance communication. The terminal then acquires the identifying information corresponding to the provision device from the wireless signals. The provision device can communicate the identifying information according to a predefined communication protocol. Referring back to 110, obtaining the information associated with the provision device can include a terminal receiving identifying information for a provision device by a terminal receiving wireless signals broadcast by the provision device, the terminal analyzing the wireless signals with an analysis protocol, and obtaining the identifying information associated with the provision device that is carried in the wireless signals broadcast by the provision device.

In some embodiments, the provision device broadcasts information associated with the provision device (e.g., identifying information for the provision device) using one or more short-distance communication modes, such as Bluetooth Low Energy (BLE), infrared, NFC, and WiFi. The provision device can use other short-distance communication modes. Wireless signals broadcast by the provision device include, but are not limited to: Bluetooth signals, infrared signals, NFC signals, and WiFi signals. The use of short-distance wireless signals ensures that the receiver receiving the wireless signals broadcast by the provision device is a terminal relatively near to the provision device (e.g., within proximity of the provision device). The user's operations (such as payment) and the process of obtaining services or physical objects (such as merchandise) from the provision device are effectively seamless. After processing payment with the provision device, the user can contemporaneously obtain the service or product (e.g., physical object) from the provision device. Accordingly, the convenience of purchasing operations with a provision device is thus improved. In addition, short-distance wireless signals are generally low-energy methods for communication. The use of short-distance wireless signals for communicating with a terminal in close proximity thereof effectively lowers the operating cost of the provision device.

The analysis protocol used by the terminal in connection with analyzing the wireless signals can be built into the wireless communication chip internal to the terminal, the analysis protocol can be preset within the operating system of the terminal, or the analysis protocol can be downloaded in advance (or contemporaneous with the obtaining of the wireless signals) by the terminal.

The identifying information receiver (e.g., a server) that obtains the information associated with the provision device from the terminal can use the information associated with the provision device in connection with determining provision information. For example, after the terminal communicates identifying information for the provision device to the identifying information receiver, the identifying information receiver uses the identifying information as a basis for querying a database mapping provision information and identities of provision devices that provide the corresponding provision information to obtain provision information corresponding to the provision device and communicating (e.g., pushing) such corresponding provision information to the terminal.

The terminal can provide the provision information to the user. For example, the terminal can provide the provision information in a manner that helps the user understand the one or more services or products provided by the provision device. In order to ensure that the user can clearly and intuitively grasp the provision information of the provision device, the terminal displays the provision information received by the terminal in an interface (e.g., a user interface, or specifically, a graphical user interface) of the terminal. The "interface" includes, but is not limited to: a terminal desktop, a menu interface, and a lock screen interface.

In response to obtaining the provision information, the terminal can display the received provision information. For example, the terminal can display the provision information in the form of a page, control, or notification message on the terminal's desktop, lock screen interface, notification box, or other such area. The terminal can display a subset of the obtained provision information. Thus, the user can intuitively browse the provision information associated with the provision device on the current interface of the terminal (e.g., that is operated by the user such as a user's smartphone). The terminal can provide the provision information for operating a selected service. For example, the user can use the terminal to interface with the provision device or otherwise in connection with obtaining a service or product from the provision device. The user can (e.g., directly) perform operations on the provision information displayed by the terminal. For example, in a scenario in which the provision information includes product information, the user can directly perform a purchasing operation on the product information for a particular product and thereby purchase the product.

The related art merely enables a terminal to perform a single operation, such as QR code scanning or near-field communication from an extremely short distance that is directed at one service item in a provision device. However, in contrast to the related art, according to various embodiments, the terminal can obtain various information associated with a provision device such as provision information associated with the provision device (e.g., from the server without being limited by the distance to the provision device). In some embodiments, the terminal can process payments (e.g., input payment information, submit payment to the provision device or a server, etc.), select a product or service, etc. from a user interface provided on the terminal. In this way, a terminal can be used to more easily acquire items for purchasing (e.g., products or services) provided by the provision device. Services provided by the provision device can include traffic information, weather information, news information, financial information, software as a service, etc. Various embodiments increase convenience and efficiency during purchases of services or products (e.g., physical objects) from a provision device. The services provided by the provision device can include taking a photo, displaying content such as a movie, playing audio associated with a file (e.g., a song), etc.

In some embodiments, the terminal provides provision information that the terminal obtained to a user. The terminal can provide the provision information on a user interface. As an example, the terminal provides the provision information in the form of an information card in the terminal interface. As another example, the terminal provides the provision information on an interface displayed in an application running on the terminal.

The information card mentioned can be a card-shaped information prompt control displayed on the terminal. The information card can support multiple formats of information display such as pictures, text, and flash. Moreover, the information card itself can be displayed in various forms, such as a floating window, a pop-up, notification, or embedded, on the terminal interface. In some embodiments, the information card is generated by populating a predefined template with information (e.g., product information, physical object information, or other information extracted from the provision information). The populating of the predefined template with information can comprise populating the physical object information presented in an operable area of the information card or template.

Various provision devices can provide various products or services. For example, the products sold by different vending machines can differ. In order to enable the user to clearly determine the specific provision device and the physical objects provided by the provision device, the provided provision information can include an indication of the provision device and the products or services provided by the provision device. For example, if the provision information is provided in an information card, the information card can separately display the equipment information of the provision device and the physical object information (e.g., the products and services being offered) corresponding to that provision device. The physical object information can be a subset of information comprised in the provision information.

Specifically, the ways in which the terminal displays said received provision information on said terminal interface may include: displaying the equipment information for said offline physical equipment in information card form on said terminal interface.

The terminal can display the received provision information on an interface of the terminal. To display the received provision information on the interface can include displaying the equipment information for the provision device in an information card form on the terminal interface. For example, in the case of the terminal being a mobile phone and the provision device being Vending Machine A, if the mobile phone held by the user is within range of the wireless signals broadcast by Vending Machine A, the mobile phone can acquire an identifier (ID) of Vending Machine A, send the ID to a corresponding server (e.g., that stores, or can provide, provision information for Vending Machine A), and obtain the provision information corresponding to Vending Machine A that the server communicates to the terminal (e.g., as feedback to the request for provision information). The terminal can provide at least a subset of the provision information to a user, select a product or service to be purchased from the Vending Machine A, etc.

Figure 2A:
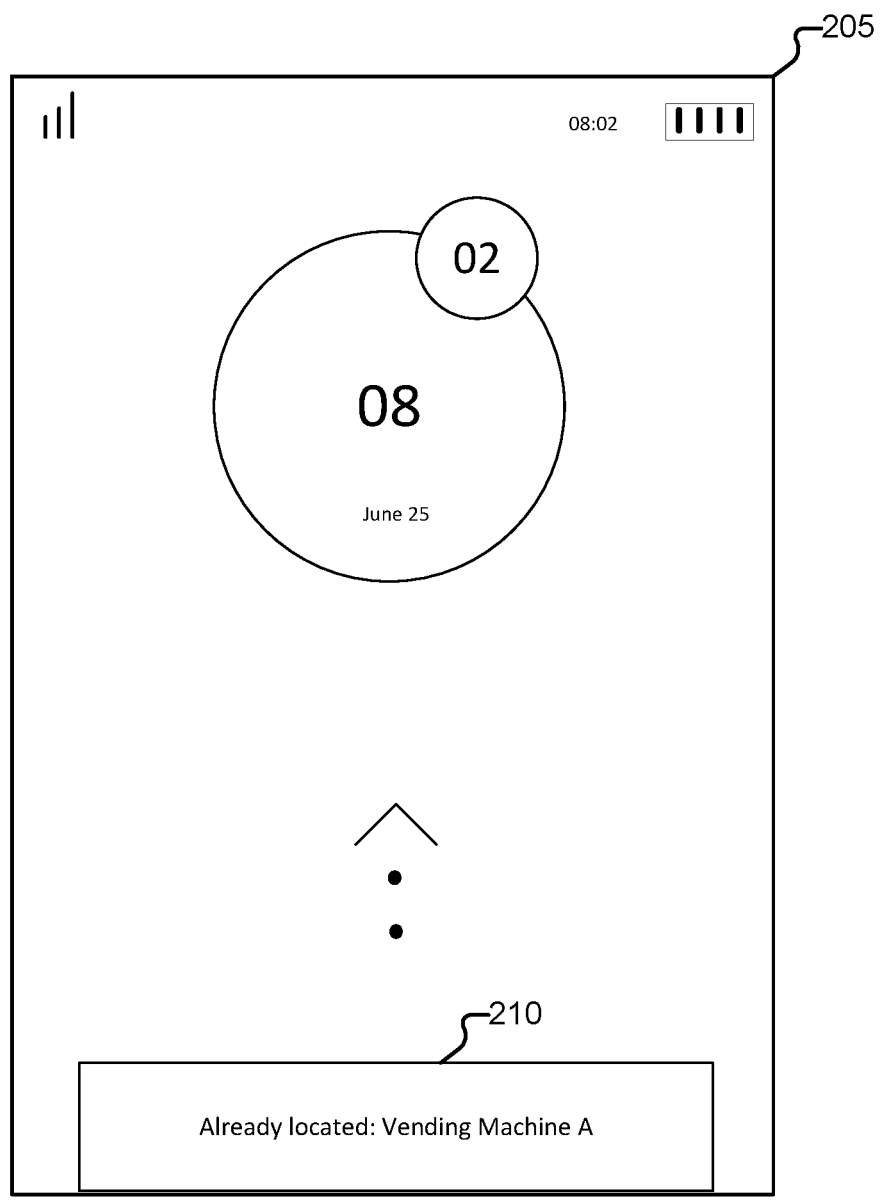
FIGS. 2A, 2B, and 2C are diagrams of interfaces displayed by a terminal depicting offline physical equipment provision information according to various embodiments of the present disclosure.
Figure 2B:
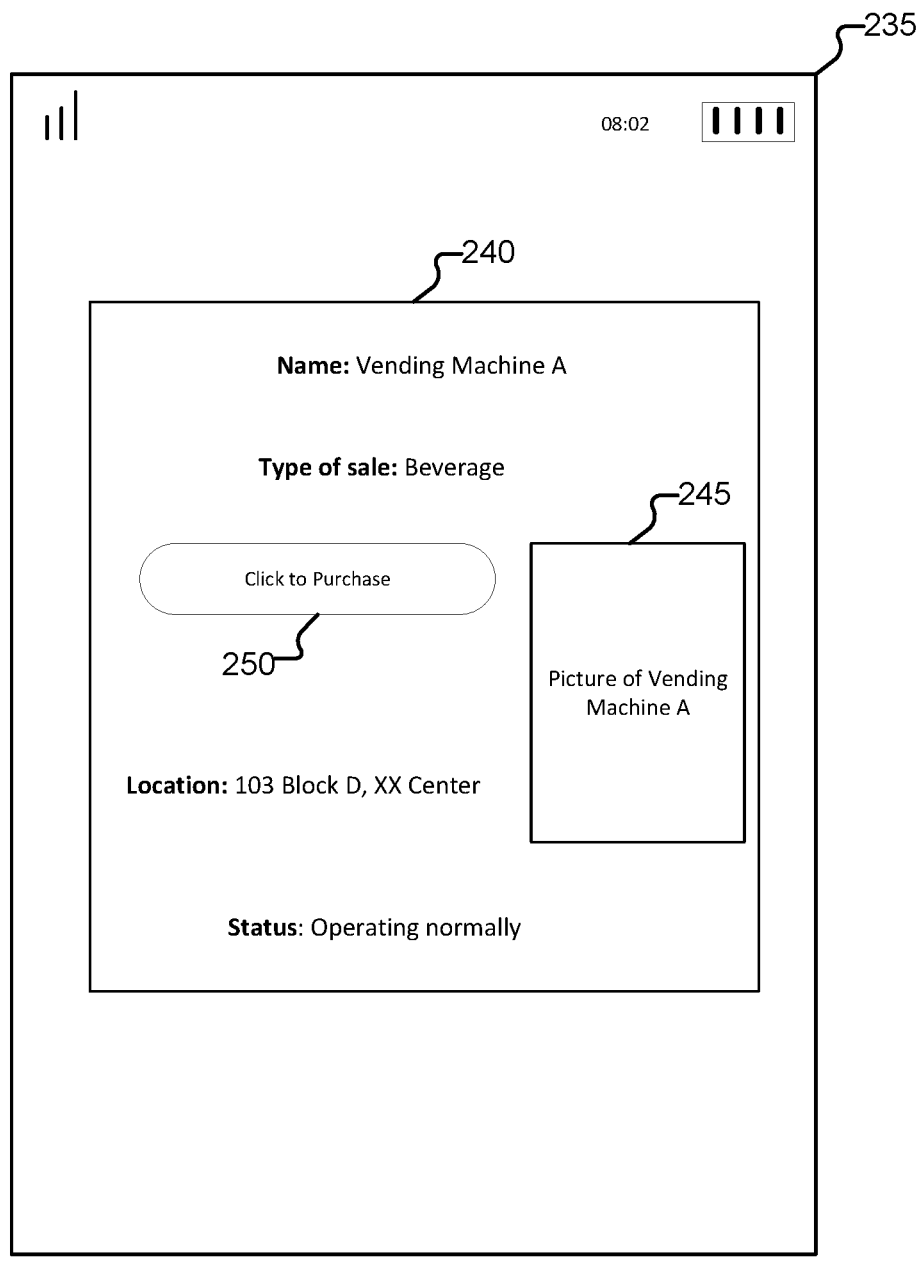
Figure 2C:
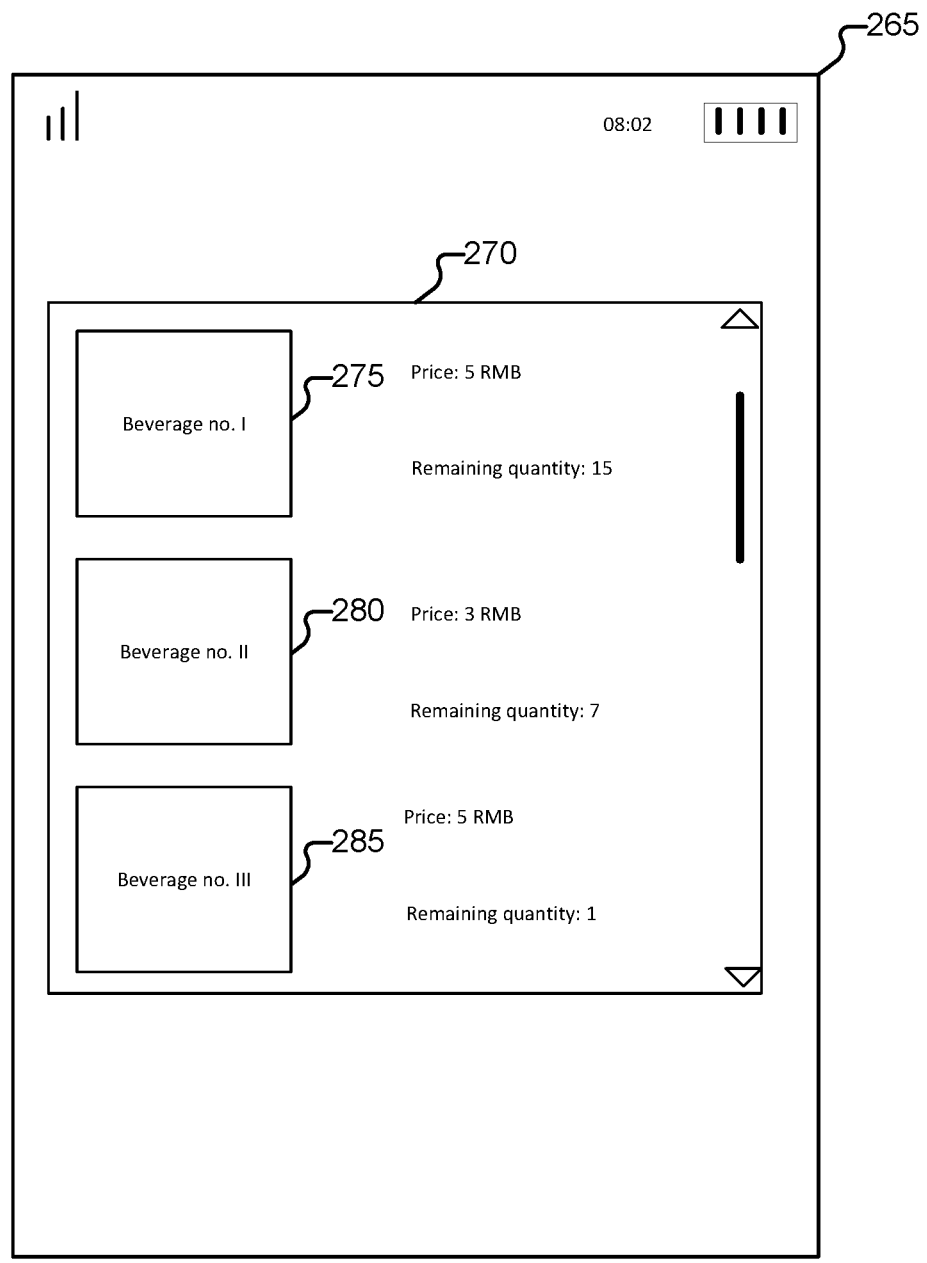

FIGS. 2A, 2B, and 2C are diagrams of interfaces displayed by a terminal depicting offline physical equipment provision information according to various embodiments of the present disclosure.

Referring to FIGS. 2A, 2B, and 2C, interface 200, interface 230, and interface 260 are provided. Interface 200 of FIG. 2A, interface 230 of FIG. 2B, and/or interface 260 of FIG. 2C can be implemented by, or in connection with, process 100 of FIG. 1, process 400 of FIG. 4, and/or process 500 of FIG. 5. Interface 200 of FIG. 2A, interface 230 of FIG. 2B, and/or interface 260 of FIG. 2C can be implemented in connection with interface 300 of FIG. 3A and/or interface 350 of FIG. 3B. Interface 200 of FIG. 2A, interface 230 of FIG. 2B, and/or interface 260 of FIG. 2C can be implemented at least in part by system 600 of FIG. 6, and/or computer system 700 of FIG. 7.

FIG. 2A illustrates interface 200 that is provided by the terminal. Interface 200 can include a screen 205. As an example, screen 205 is displayed by the terminal when the terminal is locked (e.g., when the terminal is in a screen-lock state). In some embodiments, the terminal displays screen 205 in response to the terminal obtaining information associated with a provision device and/or in response to the terminal obtaining provision information with the provision device. In some embodiments, the terminal displays screen 205 in response to the terminal detecting a provision device (e.g., such as via detecting a wireless signal communicated by the provision device).

Screen 205 comprises element 210 that provides information associated with a provision device. Element 210 can provide an indication associated with the provision device. For example, element 210 can display an indication that a provision device is detected, an indication that identifying information associated with a provision device is obtained, an indication that provision information associated with a provision device is obtained, an indication that one or more provision devices are located near the terminal (e.g., within a threshold distance of the terminal), etc. In some embodiments, element 210 is provided in the form of an information card on a user interface. The information card can be partially displayed on the lock screen interface 205 of the terminal. For example, when a terminal is in an unlocked state, a subset of information associated with the provision device can be displayed on screen 205. The information card can notify the user of information related to the provision device (e.g., the information card can include a notification message). In some embodiments, a user of the terminal can input one or more inputs to the terminal in connection with element 210. For example, the terminal can perform one or more functions in response to an input to element 210.

The terminal can be transitioned based on input from a user. For example, the terminal can be transitioned from a locked state to an unlocked state. The terminal can transition from a locked state to an unlocked state in response to a user input. As another example, the terminal can transition from displaying screen 205 to another screen (e.g., screen 235 of FIG. 2B). The screen displayed by the terminal in response to the transition from screen 205 comprises a greater level of detail of information associated with the provision device (as compared to screen 205). In response to a predefined user input, the terminal displays screen 235 of FIG. 2B. The predefined user input can be a user swipe to the information card (e.g., element 210) in order to view detailed information about the provision device (e.g., Vending Machine A).

FIG. 2B illustrates interface 230 that is provided by the terminal. Interface 230 can include a screen 235. Screen 235 comprises element 240 that provides information associated with a provision device. In some embodiments, element 240 is provided in the form of an information card on a user interface.

Element 240 can comprise detailed information associated with the provision device (e.g., Vending Machine A). For example, element 240 can comprise provision information for the provision device. The provision information for the provision device comprises one or more of an identifier of the provision device, a name of the provision device, an identifier of a type of service or product provided by the provision device, an image associated with the provision device, a location of the provision device (e.g., a street address, GPS coordinates, etc.), an indicator of an operational status of the provision device (e.g., operating normally, out of product, disabled, etc.), etc. Element 240 can comprise image 245 corresponding to a picture of the provision device. In some embodiments, element 240 comprises an object to which an input can be input. For example, element 240 can comprise a button 250 with which a user can complete a purchase. In response to selection of button 250, the terminal (e.g., element 240) can provide an interface with which a user can complete a purchase. The interface with which the user can complete a purchase allows a user to select one or more services or products to purchase, to select a quantity of the selected one or more services or products to purchase, to input payment information, to select stored payment information, to input a time at which the user will obtain the one or more services or products to purchase, etc.

In some embodiments, element 240 displays information associated with a provision device. Example 240 can display an indication that a provision device is detected, an indication that identifying information associated with a provision device is obtained, an indication that provision information associated with a provision device is obtained, an indication that one or more provision devices are located near the terminal (e.g., within a threshold distance of the terminal), etc.

In some embodiments, element 240 is provided in the form of an information card on a user interface. The information card comprises the obtained provision information associated with the provision device, or a portion of such provision information.

Screen 235 can be displayed in response to a predefined user input. In some embodiments, screen 235 is displayed in response to a launch of an application (e.g., associated with obtaining provision information of a provision device). In some embodiments, screen 235 is displayed in response to selection of element 210 provided on screen 205 when the terminal is in a locked state. In some embodiments, screen 235 is displayed in response to provision information associated with the provision device being obtained (e.g., when the terminal is in an unlocked state).

As illustrated in FIG. 2B, the information card is fully displayed on the interface of the terminal. The information card provided on screen 235 comprises more provision information associated with the provision device than the information card provided on screen 205. For example, the information card provided on screen 235 displays detailed equipment information (including name of Vending Machine A, type of sale, location, status, and appearance) about Vending Machine A. Accordingly, the user can gain a detailed understanding of Vending Machine A information based on this information card.

Of course, the above example presents an exemplary description of a scenario in which an information card is displayed in the form of a notification message on a terminal lock screen interface. In an actual application, the provision information or notification that information associated with the provision device is obtained can also be displayed on the main interface, the menu interface, or some other interface of a terminal. Moreover, the information card could also be displayed in various other forms, including as a pop-up, a floating window, or embedded.

Element 240 (e.g., information card) of FIG. 2B displays equipment information for Vending Machine A. If the user wants to purchase a product in Vending Machine A, the user can perform an operation on the element 240 (e.g., the information card). For example, the user can select the button 250 (e.g., labeled with the words "Click to Purchase" on the information card) and thereby browse the provision information corresponding to Vending Machine A (e.g., that provides information associated with one or more services or products provided by Vending Machine A). In some embodiments, the provision information comprises: physical object information provided by the offline physical equipment. As an example, the physical object information can comprise product information, including product identifiers, prices, quantities, nutrition information, and other information on products or services provided by the provision device. The terminal can display the physical object information provided by the provision device in an information card provided on an interface of the terminal.

The terminal can be transitioned from displaying screen 235 to another screen. For example, in response to an input to the terminal, the terminal can transition from displaying element 240 to another element or can update information being displayed by element 240. Continuing to apply the example above, in response to the user clicking on the button 250 labeled with the words "Click to Purchase" in element 240 of FIG. 2B, an information card comprising product information on one or more products or services sold by Vending Machine A is displayed on the terminal.

FIG. 2C illustrates interface 260 that is provided by the terminal. Interface 260 can include a screen 265. Screen 265 comprises element 270 that provides information associated with a provision device. In some embodiments, element 270 is provided in the form of an information card on a user interface.

Element 270 can provide product information for one or more products or services provided by the terminal. For example, as illustrated in FIG. 2C, element 270 comprises information associated with a first product 275 (e.g., Beverage No. 1), information associated with a second product 280 (e.g., Beverage No. 2), and information associated with a third product 285 (e.g., Beverage No. 3).

Continuing with the above example, element 270 (e.g., the information card) of FIG. 2C displays product information for products in Vending Machine A. The products are beverages in this example. Moreover, the prices and remaining quantities of different beverages are displayed so that the user can have a full knowledge of the products in Vending Machine A. According to various embodiments, the user can input one or more selections to element 270 or otherwise to interface 260. For example, by employing a swiping gesture input on the information card, the user can trigger the terminal to scroll the display of product information up or down, thus enabling the user to achieve the goal of browsing all product information. As another example, by selecting a link (e.g., an image, a button, etc.) associated with a product, the terminal can proceed to a payment for the corresponding product.

The information card of FIG. 2C (e.g., element 270) can be generated by the terminal according to a corresponding visualized card template. The terminal displaying the physical object information provided by the provision device in information card form on the terminal interface (e.g., interface 260) can comprise: the terminal obtaining the physical object information provided by the provision device, selecting from among pre-saved visualized card templates a visualized card template, generating an information card according to the physical object information and the selected visualized card template, and displaying the information card on an interface of the terminal.

The visualized card template can be regarded as a card without information content. The dimensions and colors of visualized card templates can vary. During the process of generating the information card, different visualized card templates can be selected by the terminal according to user needs, user settings, user preferences, etc. For example, if the physical object information content is relatively numerous, a visualized card template with larger dimensions can be selected to generate the corresponding information card. Of course, the above is just one possible implementation and does not constitute a restriction on the present application.

According to various embodiments, the visualized card template comprises at least one operable area. Thus, after the information card has been generated, the user can perform an operation (such as clicking) on the operable area and thereby select the corresponding physical object information. Specifically, providing physical object information in the selected visualized card template to generate an information card comprises: generating an information card with (at least a portion of) the physical object information presented in an operable area of the visualized card template. As an example, referring back to FIG. 2B, button 250 provided on element 240 can be an operable area. As another example, referring to FIG. 2C, images corresponding to first product 275, second product 280, and third product 285 can be operable areas.

According to various embodiments, an operable area can present information about one of the physical objects or services (e.g., provided by the provision device). In response to a user performing an operation on an operable area (e.g., in response to a user selecting the operable area, inputting an input to the operable area, etc.), the user may be regarded as having performed an operation on the physical object information presented in the operable area. Of course, in a different scenario in an actual application, an operable area can present two or more pieces of physical object information. This does not constitute a restriction on the present application.

In some embodiments, an operable area in the visualized card template corresponds to an area to which an input can be inputted (e.g., subjected to such operations as clicking or pressing and holding). For example, a user can perform an operation (such as clicking) in an operable area of an information card (e.g., the information card being generated from a visualized card template and thus the information card including at least one operable area) to select the corresponding physical object information. In some embodiments, after an information card is created, in response to receiving an operation instruction by the user relating to an operable area of the information card, the physical object information presented in an operable area in the information card is determined.

For example, after the user performs an appropriate operation in an operable area on the information card (e.g., the user clicks on a certain operable area), the physical object information presented by the clicked operable area (e.g., corresponding to the selection by the user) is determined.

Of course, the above content is a detailed description of information cards of the present application. However, information cards are one manner of displaying and using provision information. This does not constitute a restriction on the present application.

In an actual application, after a terminal displays provision information about the provision device, the user can perform an operation on, or in connection with, the provision information. In response to the user performing some specific operations on, or in connection with, the provision information, the provision device will perform a corresponding function. For example, an input by a user to the terminal in connection with the provision information displayed thereon (e.g., via an information card, etc.) will cause the terminal to communicate information (e.g., one or more instructions or requests) to the provision device, and the provision device will respond to such information by performing one or more corresponding functions (e.g., providing the user with the selected product or service, etc.). The terminal can communicate the information to the provision device via one or more wireless connections (e.g., infrared, NFC, Bluetooth, WiFi, etc.).

According to various embodiments, a terminal determines operational information associated with the provision information, and communicates operational information to the provision device. The operational information communicated by the terminal to the provision device corresponds to an instruction to the provision device to conduct a corresponding operation.

Continuing with the above example, the user can purchase various types of beverages displayed in the information card. The user can select (e.g., directly click) the beverage provided on the information card that the user wishes (and the user can also select the purchase quantity) and perform a payment operation in the corresponding payment interface. The payment interface can be generated by a payment server having payment functions and sent to the terminal for display. The payment server is associated with the vending machine (e.g., the provision device). In response to the payment being processed (e.g., after the payment is deemed successful), the payment server sends payment operation information to the vending machine (e.g., to the provision device). In response to receiving an indication that the payment has been processed, the provision device provides the selected one or more services or products to the user or to the terminal. Continuing with the above example, in response to the vending machine receiving an indication from the payment server that the payment has been processed (e.g., the payment operation information), the vending machine will dispense the product according to the payment operation information. For example, the payment operation information can include information (e.g., product name, identifier, bar code, etc.) indicative of the product or service that the provision device is to provide to the user or to the terminal. The payment operation information can include a quantity of the product or service that the provision device is to provide to the user or to the terminal.

In response to determining that the payment is successful, Vending Machine A will perform one or more corresponding functions (e.g., dispensing the beverage purchased by the user). In the case of provision information comprising physical object information provided by the provision device, and the operational information comprises payment operation information relating to one or more physical objects of the provision device, the terminal determines the operational information associated with the provision information and communicates operational information via the server to the provision device. According to various embodiments, the terminal determines selected physical object information from within the provision information and the payment operation information relating to the selected physical object information, regarding the selected physical object information and the payment operation information as the operational information, sending such information to said offline terminal.

According to various embodiments, after a user pays for a product or service to be purchased (e.g., a beverage that is to be provided by the provision device), the terminal will determine the beverage selected by the user for purchase. The beverage selected by the user for purchase can be determined based at least in part on a corresponding product ID. In connection with payment of the product or service, the terminal determines payment operation information. The terminal can obtain the payment operation information from a payment server (e.g., a server that processes the payment for the product or service to be purchased). In some embodiments, the presence of payment operation information is indicative that the user has paid (e.g., that payment was successful) for the product or service to be purchased. In response to the payment being successful, the provision device will provide the user (or the terminal) with the purchased product or service. The provision device can determine the purchased product or service (e.g., which product or service to provide) based on the payment operation information. For example, the provision device can obtain the payment operation information from the terminal or via a server associated with the provision device (e.g., a payment service, etc.). The payment operation information can correspond to the operational information. The operational information can be communicated to the provision device (e.g., the vending machine). In response to receiving the operational information, the provision device (e.g., the vending machine) will accordingly dispense the purchased product or service (e.g., the purchased beverage) in accordance with the communicated operational information. The operational information can be communicated to the provision device by the terminal (e.g., by a wireless connection such as WiFi, Bluetooth, infrared, etc., or via a server).

In some embodiments, the operational information is communicated to the provision device in connection with instructing the provision device (e.g., the provision device that provided the selected physical object information) to provide the product or service that is purchased. For example, the operational information is communicated to the provision device in connection with instructing the provision device to output the physical object corresponding to the selected physical object information via a physical object outlet. In the case of the provision device corresponding to a vending machine, the physical object outlet corresponds to the dispensing outlet of the provision device. Of course, this does not constitute a restriction on the present application.

According to various embodiments, a plurality of provision devices can be within a threshold distance (or within a distance within which the provision devices can communicate via a wireless communication with the terminal). For example, a large quantity of offline physical equipment can be within proximity of the terminal at any given time. When the terminal (e.g., carried by the user) is within a certain area, the terminal can obtain information (e.g., identifying information) corresponding to a plurality of provision devices. In response to obtaining identifying information corresponding to the plurality of provision devices (or other information associated therewith), the terminal can provide an interface that displays information for one or more of the plurality of provision devices. For example, the terminal can display a plurality of information cards corresponding to the plurality of provision devices for which the terminal obtained identifying information. As another example, the terminal can display one or more information cards, and an information card can comprise information corresponding to one or more of the plurality of provision devices for which the terminal obtained identifying information.

Figure 3A:
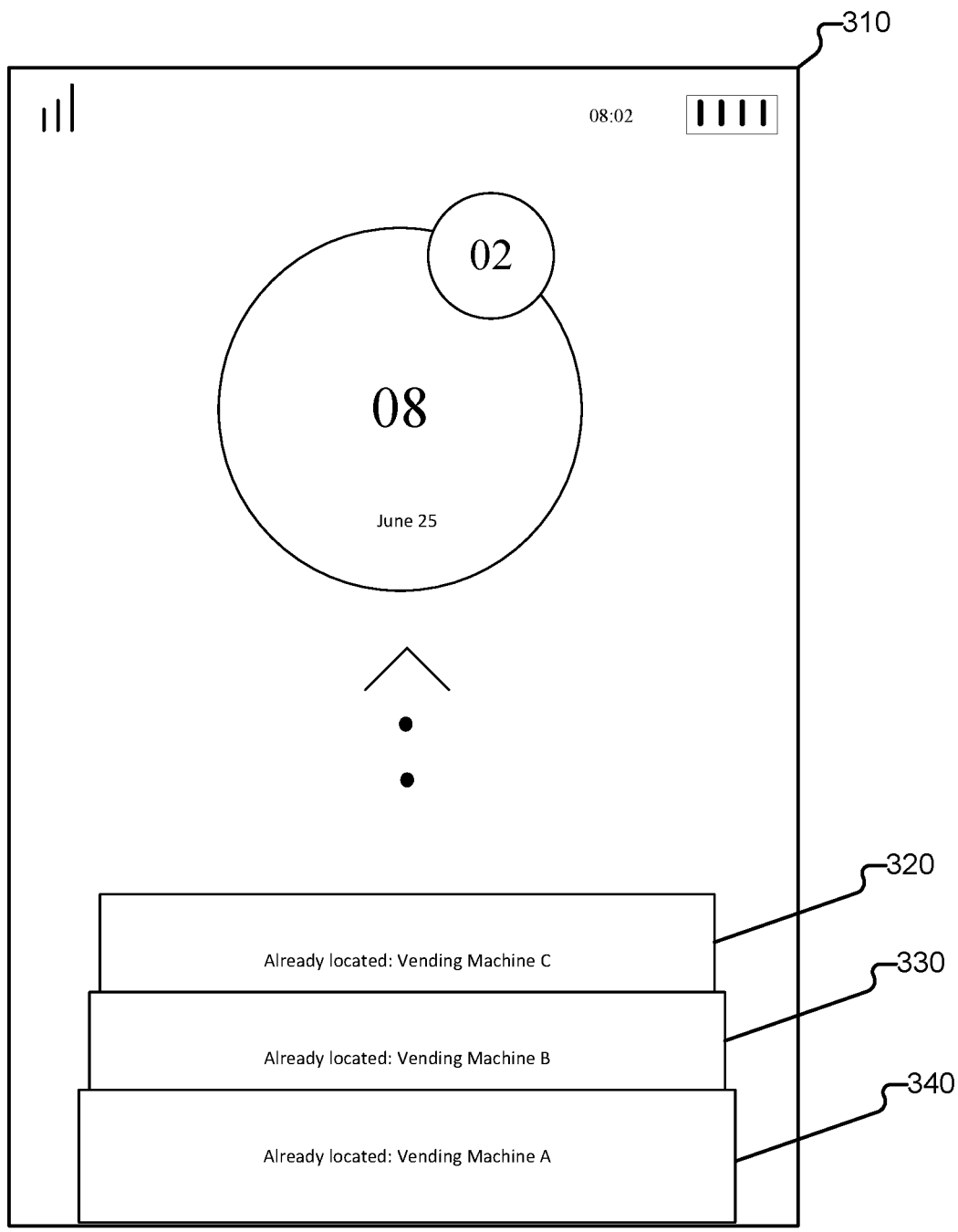
FIGS. 3A and 3B are diagrams of interfaces displayed by a terminal depicting provision information according to various embodiments of the present disclosure.
Figure 3B:
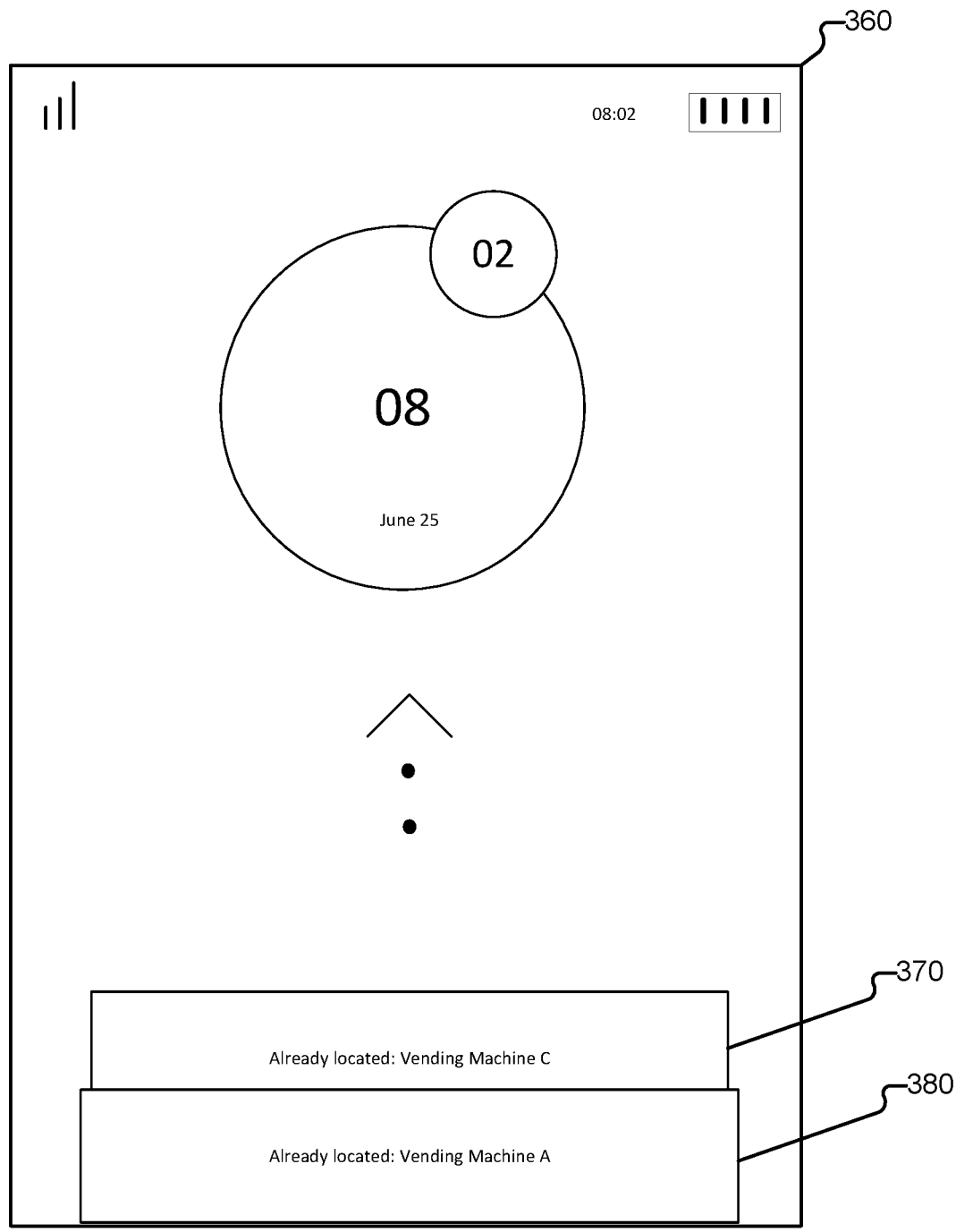

FIGS. 3A and 3B are diagrams of interfaces displayed by a terminal depicting provision information according to various embodiments of the present disclosure.

Referring to FIGS. 3A and 3B, interface 300, and interface 350 are provided. Interface 300 of FIG. 3A, and/or interface 350 of FIG. 3B can be implemented by, or in connection with, process 100 of FIG. 1, process 400 of FIG. 4, and/or process 500 of FIG. 5. Interface 300 of FIG. 3A, and/or interface 350 of FIG. 3B can be implemented in connection with interface 200 of FIG. 2A, interface 230 of FIG. 2B, and/or interface 260 of FIG. 2C. Interface 300 of FIG. 3A and/or interface 350 of FIG. 3B can be implemented at least in part by system 600 of FIG. 6, and/or computer system 700 of FIG. 7.

FIG. 3A illustrates interface 300 that is provided by the terminal. Interface 300 can include a screen 310. As an example, screen 310 is displayed by the terminal when the terminal is locked (e.g., when the terminal is in a screen-lock state). In some embodiments, the terminal displays screen 310 in response to the terminal obtaining information associated with a provision device and/or in response to the terminal obtaining provision information with the provision device. In some embodiments, the terminal displays screen 310 in response to the terminal detecting a provision device (e.g., such as via detecting a wireless signal communicated by the provision device).

Screen 310 comprises element 320, element 330, and/or element 340 that respectively provide information associated with a corresponding provision device. Screen 310 can comprise various numbers of elements. In some embodiments, a number of elements providing information associated with provision devices is based at least in part on a number of provision devices for which the terminal obtains information (e.g., identifying information). The terminal can add or remove an element (e.g., element 320, element 330, and/or element 340) from interface 300 in response to the terminal obtaining information associated with a provision device, the terminal detecting a provision device within proximity of the terminal, the terminal determining that a previously detected provision device is no longer within range of the terminal, etc. For example, the terminal can update the interface 300 based on the one or more provision devices with which the terminal can communicate (e.g., at a given time).

Element 320, element 330, and/or element 340 can provide an indication associated with a corresponding provision device. For example, element 320, element 330, and/or element 340 can display an indication that a provision device is detected, an indication that identifying information associated with a corresponding provision device is obtained, an indication that provision information associated with a corresponding provision device is obtained, an indication that one or more provision devices are located near the terminal (e.g., within a threshold distance of the terminal), etc. In some embodiments, element 320, element 330, and/or element 340 is provided in the form of an information card on a user interface. The information card can be partially displayed on the lock screen interface 310 of the terminal. For example, a subset of information associated with a provision device that is displayed when a terminal is in an unlocked state can be displayed on screen 310 (e.g., when the terminal is in a locked state). The information card can notify the user of information related to the corresponding one or more provision devices (e.g., the information card can include a notification message). In some embodiments, a user of the terminal can input one or more inputs to the terminal in connection with element 320, element 330, and/or element 340. For example, the terminal can perform one or more functions in response to an input to element 320, element 330, and/or element 340.

As illustrated in FIG. 3A, the terminal displays obtained information corresponding to a plurality of provision devices such as vending machines (including Vending Machine A, Vending Machine B, and Vending Machine C) in the current interface 300. The user can select different provision devices (e.g., vending machines) for querying and purchasing the products therein.

When the position of the user moves (or in response to the terminal moving), the user or the terminal may move out of range of the wireless signals broadcast by one or more provision devices, in which case the terminal will not display on the terminal interface (e.g., interface 300) the provision information for such corresponding one or more provision devices.

FIG. 3B illustrates interface 350 that is provided by the terminal. Interface 350 can include a screen 360. As an example, screen 360 is displayed by the terminal when the terminal is locked (e.g., when the terminal is in a screen-lock state). In some embodiments, the terminal displays screen 360 in response to the terminal obtaining information associated with a provision device and/or in response to the terminal obtaining provision information with the provision device. In some embodiments, the terminal displays screen 360 in response to the terminal detecting a provision device (e.g., such as via detecting a wireless signal communicated by the provision device).

Screen 360 comprises element 370 and/or element 380 that respectively provide information associated with a corresponding provision device. Element 370 can correspond to element 320 of FIG. 3A, and/or element 380 can correspond to element 340 of FIG. 3A. Screen 360 can comprise various numbers of elements. In some embodiments, a number of elements providing information associated with provision devices is based at least in part on a number of provision devices for which the terminal obtains information (e.g., identifying information). The terminal can add or remove an element (e.g., element 370 and/or element 380) from interface 350 in response to obtaining information associated with a provision device, the terminal detects a provision device within proximity of the terminal, the terminal determines that a previously detected provision device is no longer within range of the terminal, etc. For example, the terminal can update the interface 350 based on the one or more provision devices with which the terminal can communicate (e.g., at a given time).

For example, referring to FIGS. 3A and 3B, in the case that the user's position shifts (e.g., the terminal moves) and moves out of the coverage range of the wireless signals from Vending Machine B, the terminal interface will not display an element corresponding to Vending Machine B. For example, interface 350 of FIG. 3B does not include an element corresponding to element 330 of interface 300 of FIG. 3A. In response to the terminal moving out of the coverage range of the wireless signals from Vending Machine B, the terminal stops displaying provision information for Vending Machine B, but will continue to display provision information for Vending Machines A and C.

Over time, provision information corresponding to a provision device may change. For example, an administrator associated with the provision device may update information associated with the provision device. As another example, information associated with the provision device can change based on an operation of the provision device. Changes to the information associated with the provision device can include a change in product prices, a change in remaining product quantities, a change in the location of the provision device, a change in payment terms, etc. In the event that information associated with a provision device (e.g., provision information) changes, the terminal receives service update information associated with the provision device and the terminal updates the received provision information corresponding to the provision device based at least in part on service update information. In some embodiments, the provision device can communicate (e.g., push, broadcast, etc.) service update information in response to a change to information associated with the provision device. In some embodiments, the provision device can communicate (e.g., push, broadcast, etc.) provision information at predefined intervals, and the provision information communicated by the provision device can include provision information that is current as of the time of communication to ensure that the communicated provision information includes any updates since a last communication of provision information (e.g., the communicated provision information includes any service update information). The service update information can include all provision information associated with the provision device, or the service update information can reflect the update since the last communicated provision information (e.g., only the change is communicated). The terminal can determine that the obtained provision information includes an update based at least in part on information comprised in the communication of the provision information. For example, the communication of the provision information can include an identifier or flag indicative that the provision information corresponds to, or includes, service update information. As another example, the terminal can determine that the obtained provision information corresponds to, or includes, service update information by comparing the obtained provision information with previously obtained (e.g., currently stored locally at the terminal) provision information.

After the provision information associated with a provision device changes, the provision device generates service update information based on the changed provision information and communicates with (e.g., notifies) the terminal. For example, in response to a vending machine dispensing one kind of product, with the result that the product becomes sold out (e.g., the product quantity in the vending machine is now 0), the vending machine will then update the quantity information for this product and notify the terminal that the product has been sold out.

In some instances, the location of the provision device may not be easy to locate. For example, a user may not be able to locate a provision device or may not be aware of a provision device in a certain area. In some embodiments, information associated with a provision device, or provision information for the provision device can comprise location information for the provision device. The location information can be a street address, GPS coordinates, a map, etc. Accordingly, the terminal can determine the location information corresponding to the provision device that is comprised in, or communicated in connection with, the provision information. For example, the terminal extracts the location information corresponding to the provision device and presents the location information to the user. The terminal can provide a map to the user, and the map can include an indication of a location of the provision device. In some embodiments, the terminal determines the terminal location information corresponding to the terminal itself, and provides navigation (e.g., directions) on an interface of the terminal in accordance with the location information corresponding to the provision device and location information corresponding to the terminal. An interface displayed by the terminal provides a navigation function to guide the user in moving to the location of the provision device.

Figure 4:
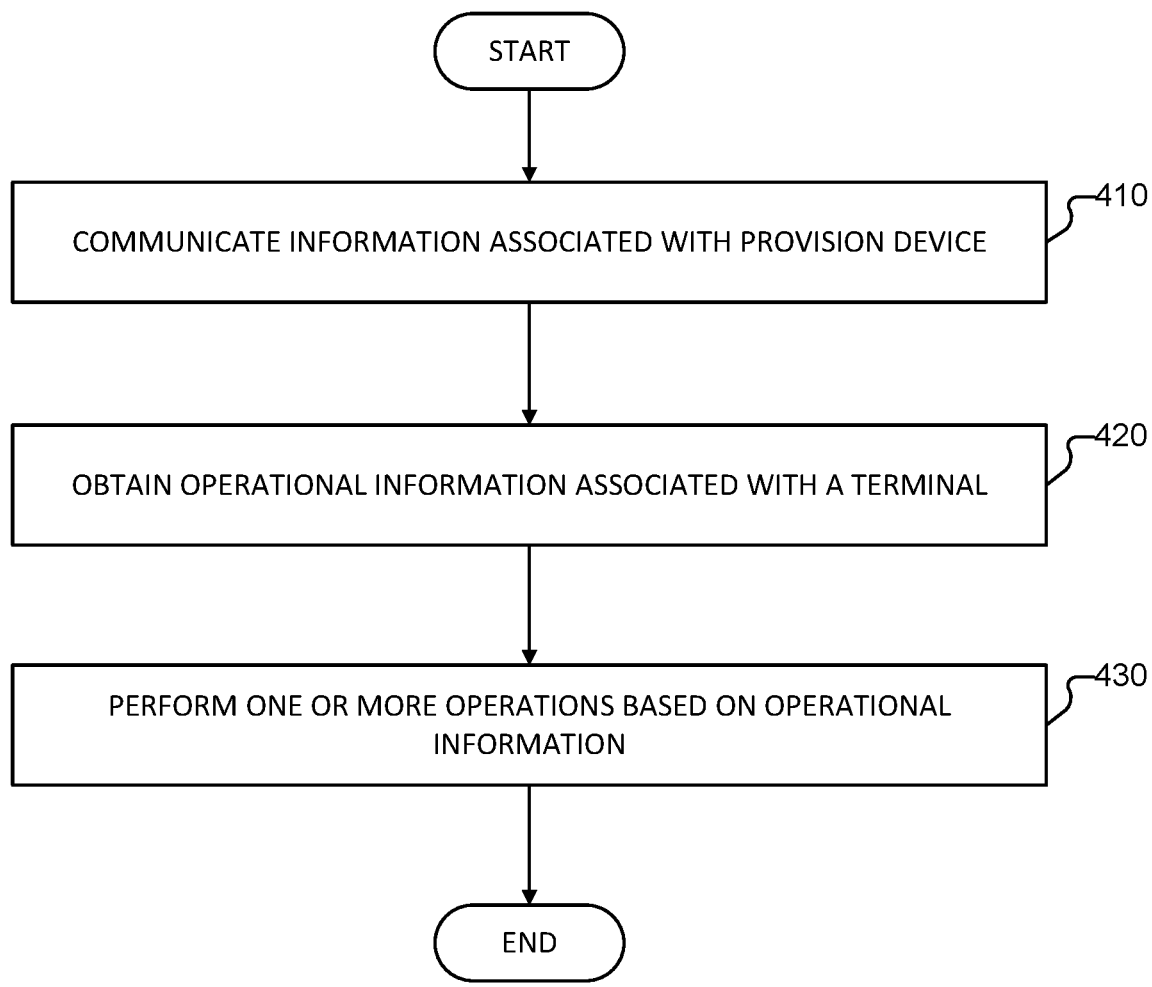
FIG. 4 is a flowchart of a method for operating a terminal that is offline according to various embodiments of the present disclosure.

FIG. 4 is a flowchart of a method for operating a terminal that is offline according to various embodiments of the present disclosure.

Referring to FIG. 4, process 400 is provided. Process 400 can be implemented in connection with interface 200 of FIG. 2A, interface 230 of FIG. 2B, interface 260 of FIG. 2C, interface 300 of FIG. 3A, interface 350 of FIG. 3B, process 100 of FIG. 1, and/or process 500 of FIG. 5. Process 400 can be implemented at least in part by system 600 of FIG. 6, and/or computer system 700 of FIG. 7. Process 400 can be implemented by a provision device such as a terminal that provides one or more products or services. For example, process 400 is implemented by a kiosk, a vending machine, or the like.

At 410, information associated with a provision device is communicated. The information associated with the provision device can be communicated to one or more terminals such as smart phones, etc. In some embodiments, the provision device broadcasts the information associated with the provision device (e.g., information associated with itself). The provision device can push the information associated with the provision device to the one or more terminals. For example, the provision device can communicate with the one or more terminals directly via one or more wireless connections. As another example, the provision device can communicate the information associated with the provision device to the one or more terminals via a server. For example, the provision device and the one or more terminals can be associated with, or in communication with, a server that provides a service. The one or more terminals can have an application installed thereon that communicates with the server to obtain the information associated with the provision device.

According to various embodiments, the information associated with the provision device comprises identifying information that identifies the provision device, configuration information for the provision device, location information for the provision device, etc. Identifying information that identifies the provision device can include a Media Access Control (MAC) address, a serial number, a model number, a version number, a unique identifier, equipment number, etc. The identifying information uniquely identifies the provision device (at least within a network or set of terminals such as a set of terminals owned by a company, etc.).

The information associated with the provision device can be communicated (e.g., broadcast) based on a wireless signal, an image, etc. For example, the terminal can obtain identifying information via a wireless signal communicated over Bluetooth, infrared, WiFi, Near Field Communications (NFC), etc. The identifying information can be broadcast from the provision device (e.g., across a network to which the provision device is communicated, or within a physical proximity of the provision device).

As stated above, the offline physical equipment employs short-distance wireless communication to broadcast its own identifying information so that one or more terminals can obtain identifying information associated with the provision device.

At 420, operational information associated with a terminal is obtained. The provision device can obtain the operational information from the terminal. The operational information corresponds to information associated with one or more products or services provided by the provision device. For example, the operational information can include order information, payment information, a quantity of one or more products or services to be provided to the user or the terminal in connection with a purchase, an identifier of one or more products or services to be provided to the user or the terminal in connection with the purchase, etc. In some embodiments, the operational information comprises a request for additional information from the operational information. For example, the terminal requests information that was not included in the information associated with the provision device that was communicated (e.g., a status of the provision device, a type of product or service provided by the provision device, a quantity of a certain product or service provided by the provision device, a location of the provision device, etc.).

The provision device can obtain the operational information from the terminal via a wireless communication (e.g., a Bluetooth, WiFi, infrared, NFC, etc.). The provision device can obtain the operational information from a server to which the terminal communicates such operational information. For example, the server provides a Software-as-a-Service (SaaS) to the terminal and/or the provision device, and can facilitate the providing of information associated with the provision device to the terminal, and/or the purchasing of one or more products and services from the provision device by the terminal.

In response to obtaining the operational information, the provision device can further determine one or more instructions or functions to perform based on the operational information. For example, in the case of the terminal purchasing one or more products or services from the provision device, the provision device can determine the one or more products or services that the terminal is purchasing, and determine one or more instructions or functions associated with the providing of the one or more products or services.

In response to the terminal performing a designated operation associated with one or more products or services provided by the provision device, corresponding operational information will be generated and sent to the offline physical equipment via a server. And in order to accurately determine a particular provision device, the server will make the determination using identifying information. In some embodiments, the operational information generated by the terminal comprises an identifier associated with the provision device, and the provision device receives operational information comprising identifying information corresponding to the provision device. For example, the server that obtains the operational information from the terminal can select the provision device to which to communicate (e.g., route) the operational information based on an identifier or other identifying information comprised in the operational information the server obtains from the terminal.

At 430, one or more operations are performed based at least in part on the operational information. In response to obtaining the operational information associated with the terminal (e.g., from the terminal or from a server associated with the terminal), the provision device performs one or more operations associated with the operational information. For example, the provision device can determine one or more operations (e.g., instructions or functions) to perform based on information comprised in the operational information.

Continuing with the example described above, if a user has paid for a physical object (e.g., a product) or a service that the provision device provides, then the operational information subsequently received by the provision device will include information associated with (e.g., identifying) the selected physical object or service and payment operation information corresponding to the information associated with the selected physical object or service. In such a situation, performing a corresponding operation according to the operational information specifically comprises: the provision device outputting a physical object (e.g., a beverage, a snack, an electronic device, etc.) corresponding to the selected physical object information via a physical object outlet.

Through the steps described above, offline physical equipment can effectively provide wireless service. Thus, the user can use a terminal directly to wirelessly obtain a service from the offline physical equipment. In contrast to the related art, wherein a terminal can only perform operations on corresponding service items from a short distance, the wireless approach of the present application effectively increases the efficiency with which offline physical services are obtained.

As stated above, provision information can be sent by the offline physical equipment to a terminal or via a server to a terminal. Based on this, process 400 can further comprise: the provision device, based on a connection established between the offline physical terminal and the terminal, sending provision information to the terminal; or the provision device sending provision information via a server to the terminal.

If a connection is established between a provision device and a terminal, then the sending of the provision information by the provision device to the terminal based on the connection comprises: receiving, by the provision device, a provision information request sent by the terminal; determining, by the provision device, whether the identifying information in the provision information request corresponds to the provision device's own identifying information; and sending, by the provision device, provision information to the terminal based on the connection if the provision device determines that the identifying information comprised in the provision information request corresponds to the provision device's own identifying information.

In some embodiments, the provision information associated with the provision device is subject to change (e.g., based on a change in location, a change in inventory, a change in quantities of inventory, etc.). For example, the location of the provision device may change (e.g., a provision device is moved to a new location). In the event that the location of the terminal changes, the location information for the provision device is updated (e.g., changes), and the equipment information of the provision device changes accordingly. As another example, the quantity, price, or other aspect of the physical objects (e.g., products) sold in the provision device may change. The physical object information of the provision device can change based on a change in the quantity, price, or other aspect of the physical objects (e.g., products) sold in the provision device. In response to a change in the provision information or the physical object information associated with the provision device, the terminal is provided with an update reflecting the change or is notified of the change. The provision device can notify the terminal of the change or provide the terminal with an update on the change, or a server can notify the terminal of the change or provide the terminal with an update on the change. In some embodiments, the provision device generates a provision information change information (e.g., an update or a notification) in response to a change in the provision information associated with the provision device, and the provision device sends the provision information change information to the terminal based on the connection between the terminal and the provision device; or the provision device sends the provision information change information via a server to the terminal.

Communication of the provision information change information to the terminal could be a direct communication via the connection established between the provision device and the terminal or a communication through a connection established with a server. If the provision information change information is communicated via the server, the terminal is not subject to distance constraints when receiving provision information or information associated with the provision device. Specifically, in response to the terminal moving within the coverage range of the wireless signals broadcast by the provision device, the terminal can obtain information associated with the provision device such as identifying information being broadcast by the provision device. The server can use the identifying information as a basis for pushing, to the terminal, the provision information or provision information change information associated with the provision device. In some embodiments, in response to a terminal sending identifying information corresponding to a provision device to the server, the server communicates (e.g., continually pushes) the provision information for the provision device to said terminal (e.g., including continually updated provision information). Of course, in such a scenario, the terminal can issue an instruction to the server rejecting the updates or the continual pushing of information by the server. Thus, the server will stop pushing the offline physical equipment provision information to the terminal. In some embodiments, the terminal or user thereof is registered with the server, and the user or terminal settings associated with the server are associated with one or more provision devices for which the user or terminal is to be provided information. For example, a user can select the provision devices for which the user is to be provided provision information, or notified of changes or updates, etc. The server can use the registration or the configuration of the user or terminal settings to determine the provision devices for which the terminal is to be provided information (e.g., provision information, provision information change information, etc.).

In some embodiments, the server determines whether the terminal is located within a threshold distance from a specific provision device (e.g., the terminal is determined to be in wireless communication range of the provision device), and in response to determining that the terminal is within a threshold distance of the specific provision device, the server provides (e.g., pushes) provision information, provision information change information, or other information to the terminal. For example, the server only pushes provision information to terminals within the wireless signal coverage range of the provision device. In response to a terminal moving to within the coverage range of wireless signals broadcast by the provision device (e.g., to within the threshold distance), the terminal establishes a connection with the provision device in order to obtain information associated with the provision device (e.g., identifying information corresponding to the provision device). However, the location of the terminal is not necessarily fixed (e.g., if the user or the terminal is mobile). For example, the terminal held by the user may move at any time. In response to the terminal moving out of the coverage range of the wireless signals broadcast by the provision device, the connection between the terminal and the offline physical equipment is broken. The server can be notified that the provision device and the terminal are not in communication, or the server determines that the terminal and the provision device are not within a threshold distance of each other based on respective location information, and thus, the server stops communicating information associated with that provision device to the terminal. For example, the server stops pushing provision information associated with the provision device to the terminal. In some embodiments, the provision device monitors a connection status between the provision device and a terminal, and, in response to detecting that the connection status is disconnected, the provision device sends to the server a notification message of such disconnected status or notifies the server to stop providing (e.g., pushing) provision information to the terminal.

In some embodiments, if the provision device has functions for sending provision information change notifications or for actively pushing provision information, the terminal can provide such information or notifications to the terminal. This does not constitute a restriction on the present application.

According to various embodiments, information associated with the terminal and/or information associated with the provision device is communicated between the terminal and the provision device via a server. The terminal and the provision device can be registered with the server. For example, the server can store mappings of information associated with the terminal or the provision device to identifiers associated with the terminal or the provision device.

Figure 5:
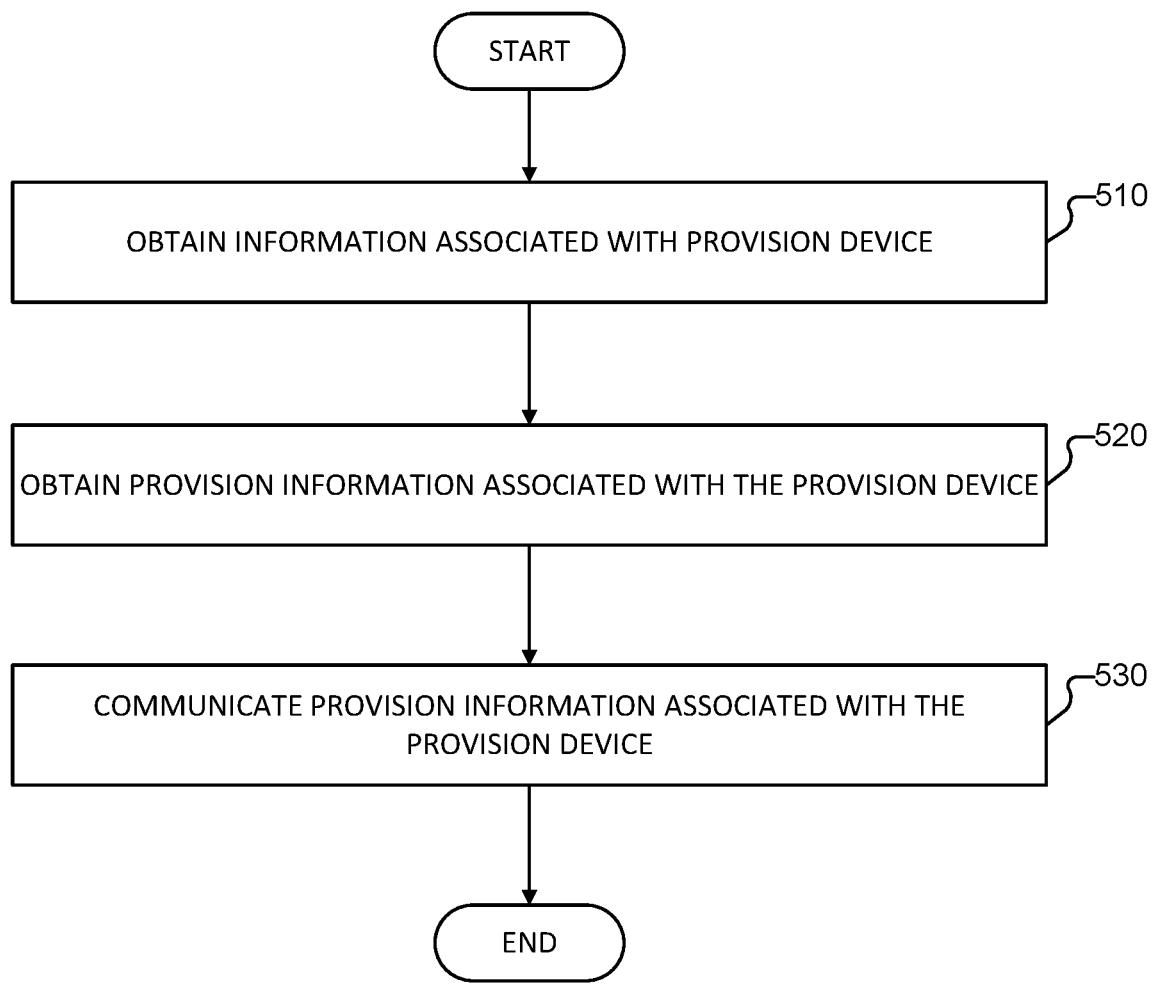
FIG. 5 is a flowchart for a method for communicating with a provision device, according to various embodiments of the present disclosure.

FIG. 5 is a flowchart for a method for communicating with a provision device, according to various embodiments of the present disclosure.

Referring to FIG. 5, process 500 is provided. Process 500 can be implemented in connection with interface 200 of FIG. 2A, interface 230 of FIG. 2B, interface 260 of FIG. 2C, interface 300 of FIG. 3A, interface 350 of FIG. 3B, process 100 of FIG. 1, and/or process 400 of FIG. 4. Process 500 can be implemented at least in part by system 600 of FIG. 6, and/or computer system 700 of FIG. 7. Process 500 can be implemented by a server such as a server that provides SaaS and/or with which a terminal and/or provision device is registered.

At 510, information associated with a provision device is obtained. A server can receive the information associated with the provision device from a terminal. For example, the information associated with the provision device that the server receives is the same or comprises the information associated with the provision device that the terminal obtained such as via a broadcast by the provision device. The server can obtain the information associated with the provision device in connection with a request for provision information associated with the provision device, or in connection with a purchase of a product or service provided by the provision device. The information associated with the provision device that is received by the server can correspond to identifying information associated with the provision device.

At 520, provision information associated with the provision device is obtained. The server obtains the provision information associated with the provision device in response to receiving the identifying information associated with the terminal. For example, the server receives a request for provision information from a terminal, and in response to receiving the request for provision information associated with the provision device (e.g., from the terminal), the server obtains the corresponding provision information. The server can obtain the corresponding provision information based at least in part on the obtained information associated with the provision device. For example, the server can query a mapping of identifiers associated with provision devices to provision information in connection with obtaining the provision information corresponding to the provision device that is identified by the identifying information obtained by the server (e.g., in connection with the request for provision information). The mapping of identifiers associated with provision devices to provision information can be stored locally at the server or at a remote repository to which the server has access.

At 530, provision information associated with the provision device is communicated. The server can communicate the provision information associated with the provision device to the terminal. For example, in response to receiving a request for provision information for a provision device and obtaining the provision information corresponding to the provision device, the server communicates the provision information to the terminal. The server can communicate the provision information by pushing the provision information to the terminal.

The server can further receive provision information sent by the provision device (e.g., reflecting changes to the provision information such as inventory levels, operational status, location, etc.), determine the identifying information of the provision device associated the received provision information, store the provision information, and establish a correspondence between the provision information and the identifying information.

In an embodiment of the present application, each provision device can use its respective identifying information to register with a corresponding server. After the provision device has completed the registration process, the provision device can send provision information such as physical object information (e.g., product information including product quantities, types, and selling prices) of its own physical objects (e.g., products) and location information (including longitude and latitude coordinates, building floor, and place identification number) to the server. The server, based on the provision information uploaded by different provision devices, provides the Internet services associated with the provision information individually uploaded by the corresponding provision devices.

In response to receiving identifying information from the terminal, the server uses the identifying information as a basis for uniquely determining the provision device corresponding to the identifying information, and provides all or some of the provision information corresponding to the provision device as feedback to the terminal. The server can be a single server for providing provision devices Internet service in a service system of an Internet service provider or a server within a server cluster having the same functions.

The provision device can be pre-registered on the server, and the provision device can upload its own provision information to the server for storage. Accordingly, the service functions provided by the provision device are Internet-enabled. Therefore, the provision device communicates its provision information to the server, which stores the provision information in association with the provision device.

The provision information comprises equipment information of the provision device, and/or information associated with one or more products or services provided by the terminal (including physical object information provided by the provision device).

The provision information associated with a provision device is subject to change. In this case, the provision device sends a provision information change notification to the server. Accordingly, the server receives a provision information change notification sent by the provision device, determines the identifying information of the provision device (e.g., that is included in the provision information change notification), determines (e.g., looks up) provision information having an established correspondence with the identifying information that is determined based on (e.g., obtained from) the provision information change notification, and updates the looked-up provision information according to the provision information change notification.

In some embodiments, the server pushes provision information to the terminal. For example, in response to a change to the provision information (e.g., in response to the server receiving a provision information change notification from a provision device), the server pushes the provision information (or the change therein) to the terminal.

In some embodiments, the terminal moves out of the coverage range of the wireless signals broadcast by the provision device, thereby causing the terminal to disconnect from the provision device. In response to the disconnection of communication between the terminal and the provision device, the provision device can send a connection status notification to the server. Accordingly, the server receives a connection status notification sent by the provision device, determines the terminal corresponding to the connection status notice, and stops pushing or otherwise communicating the provision information associated with the provision device to the terminal.

In response to the user using the terminal to send an operation (such as purchasing) concerning a product or service provided by (e.g., physical object in) the provision device, the terminal sends corresponding operational information to the server. In response to receiving the operational information from the terminal, the server sends the operational information to the corresponding provision device to instruct the offline physical equipment to conduct a corresponding operation. The server receives operational information sent by the terminal, and sends the operational information to the provision device, wherein the operational information includes instructions for the provision device to conduct a corresponding operation. In some embodiments, the server processes one or more purchases for a transaction between the terminal and the provision device. For example, the server can process a payment or purchase in response to receiving the operational information from the terminal. In such instances, the operational information comprises, or is communicated in connection with, payment information.

In response to a user using a terminal to pay for a physical object provided by the provision device, the terminal sends the corresponding payment operation information and user-selected physical object information to the server. In response to receiving the payment operation information and user-selected physical object information from the terminal, the server can forward the aforesaid information (or a portion thereof) to the corresponding provision device. As an example, the server can process the payment for the transaction between the terminal and the provision device. As another example, the server can forward payment information to a payment server to process the payment for the transaction between the terminal and the provision device. The receiving of operational information sent by the terminal can include receiving selected physical object information sent by the terminal and payment operation information concerning the selected physical object information. The sending of the operational information to the provision device comprises: sending the selected physical object information and the payment operation information to the provision device.

According to various embodiments, the terminal uses the obtained identifying information for the provision device to acquire from the corresponding server provision information associated with the offline physical equipment. The user can use the terminal to conveniently learn via the Internet about the different provision information items provided by the provision device and can conveniently obtain the service corresponding to any provision information item. Such an approach frees the terminal from distance constraints vis-à-vis the provision device in connection with acquiring provision information associated with the provision device. Not only does the obtaining of provision information associated with a provision device via a communication system such as a wireless communication increase the convenience of obtaining service items provided by the provision device, but also increases the efficiency of obtaining service.

Figure 6:
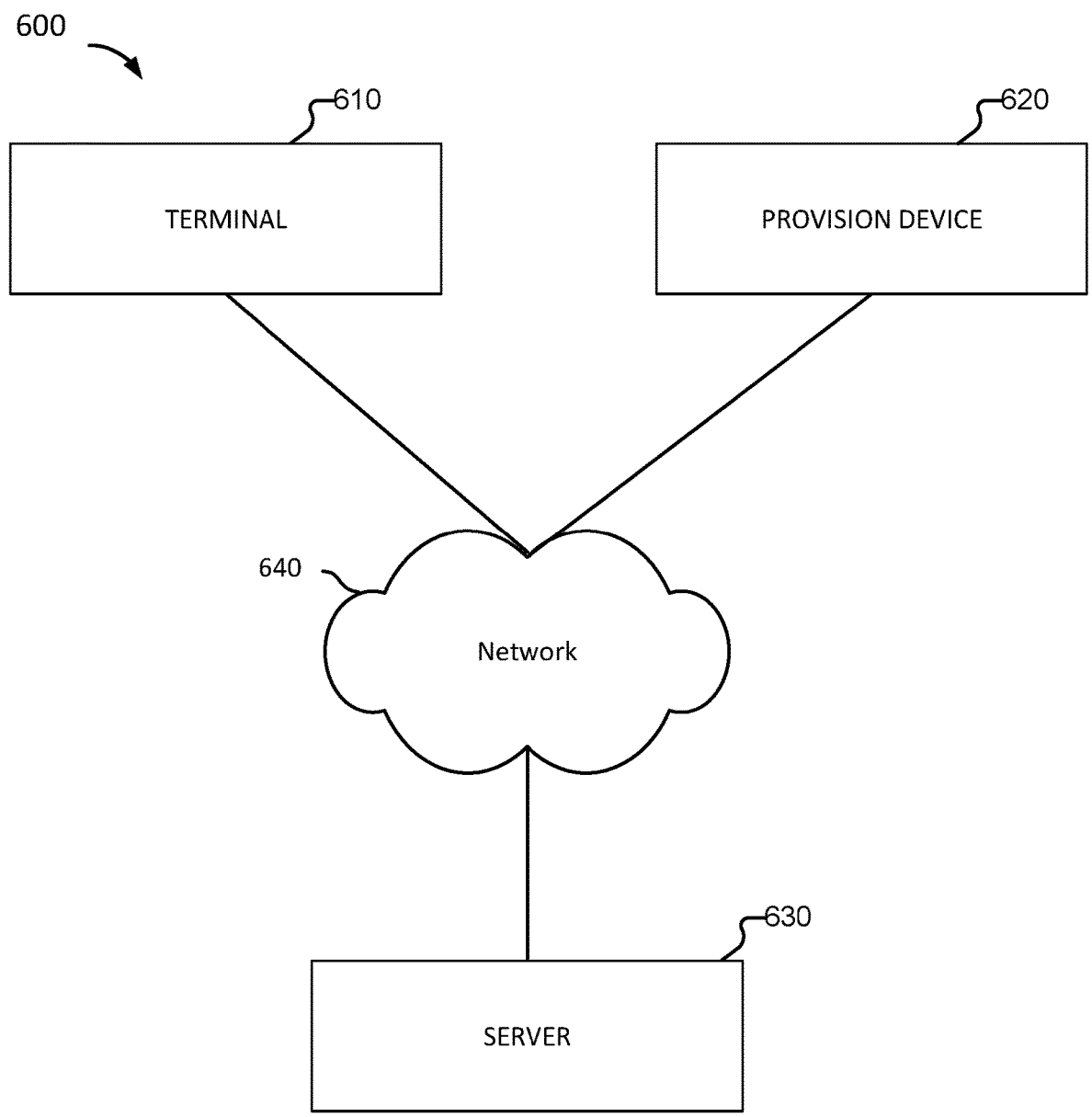
FIG. 6 is a structural diagram of a system for obtaining service at a provision device, according to various embodiments of the present disclosure.

FIG. 6 is a structural diagram of a system for obtaining service at a provision device, according to various embodiments of the present disclosure.

Referring to FIG. 6, system 600 is provided. System 600 can be implemented in connection with interface 200 of FIG. 2A, interface 230 of FIG. 2B, interface 260 of FIG. 2C, interface 300 of FIG. 3A, and/or interface 350 of FIG. 3B. System 600 can implement process 100 of FIG. 1, process 400 of FIG. 4, and/or process 500 of FIG. 5. System 600 can be implemented at least in part by computer system 700 of FIG. 7. System 600 can implement a terminal, a provision device, a server, etc.

As illustrated in FIG. 6, system 600 comprises terminal 610, provision device 620, and server 300. System 600 can further comprise one or more networks 640 over which one or more of terminal 610, provision device 620, and server 630 communicate.

Terminal 610 can correspond to the terminal that obtains information associated with the provision device, communicates information associated with the provision device, and obtains provision information associated with the provision device. For example, terminal 610 can obtain one or more products or services from provision device 620. Terminal 610 can communicate with server 630 in connection with the obtaining of the one or more products or services from provision device 620. Terminal 610 can communicate with provision device 620 and/or server 630 via one or more networks 640. Terminal 610 can implement process 100 of FIG. 1.

Provision device 620 provides one or more products or services to terminal 610 or a user thereof. Provision device 620 can be a kiosk, a vending machine, an ATM, etc. Provision device 620 can communicate directly with terminal 610 or with terminal 610 via server 630. Provision device 620 can implement process 400 of FIG. 4.

Server 630 communicates with terminal 610 and provision device 620 in connection with a transaction for one or more products or services between terminal 610 and provision device 620. Server 630 can provide terminal 610 with provision information associated with provision device 620, and can receive order information or payment information from terminal 610. Server 630 can receive operational information from terminal 610 and can provide the operational information to provision device 620.

Figure 7:
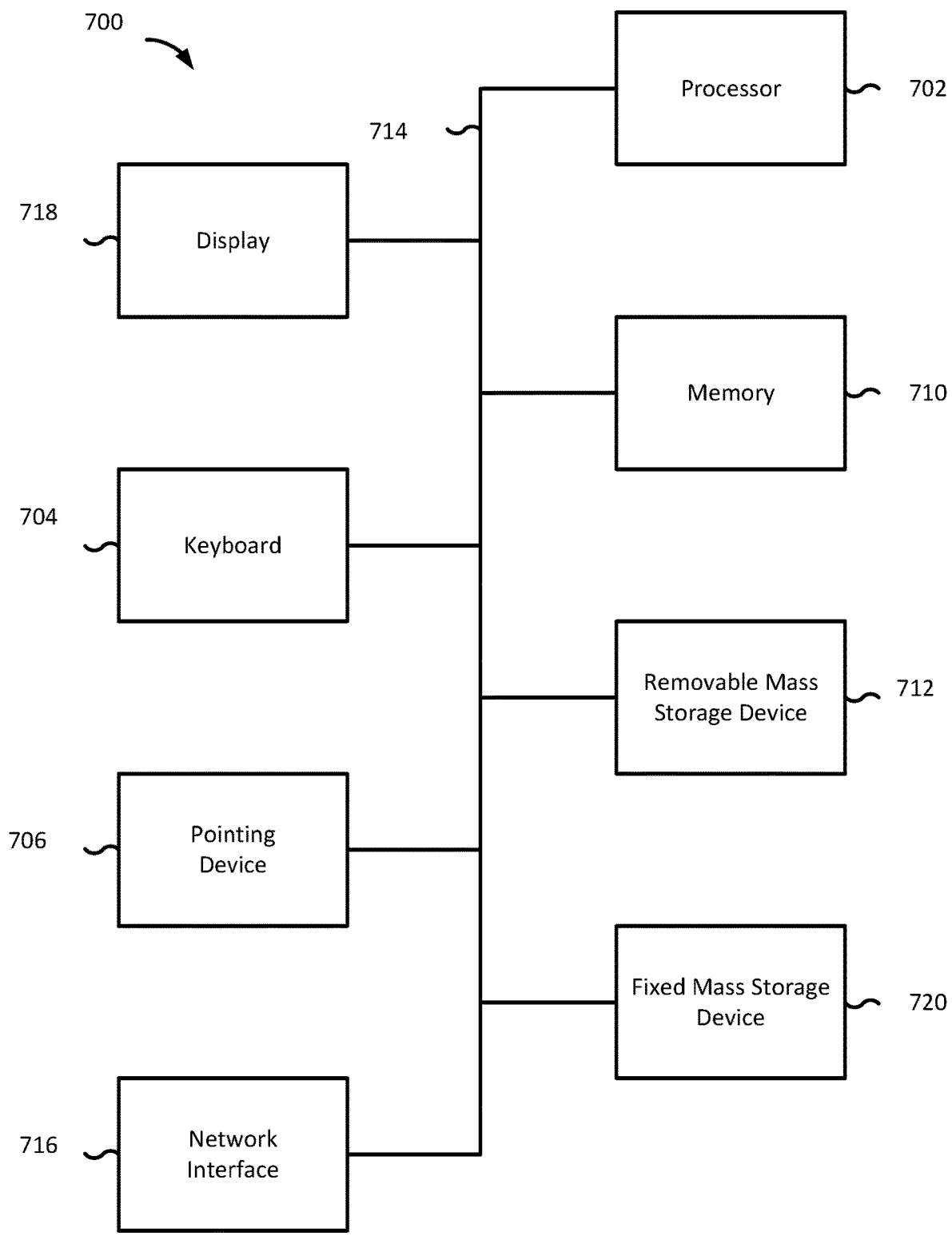
FIG. 7 is a functional diagram of a computer system for obtaining service, executing operations, and/or communicating with a provision device according to various embodiments of the present disclosure.

FIG. 7 is a functional diagram of a computer system for obtaining service, executing operations, and/or communicating with a provision device according to various embodiments of the present disclosure.

Referring to FIG. 7, computer system 700 is provided. Computer system 700 can be implemented in connection with interface 200 of FIG. 2A, interface 230 of FIG. 2B, interface 260 of FIG. 2C, interface 300 of FIG. 3A, and/or interface 350 of FIG. 3B. Computer system 700 can implement process 100 of FIG. 1, process 400 of FIG. 4, and/or process 500 of FIG. 5. Computer system 700 can be implemented at least in part by system 600 of FIG. 6. Computer system 700 can implement a terminal, a provision device, a server, etc.

Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

A module described herein can also be referred to as a unit.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The aforesaid integrated units can take the form of hardware, or they can take the form of hardware combined with software function units.

The units described above in which the software function units are integrated can be stored in a computer-readable storage medium. The software function units described above are stored in a storage medium and include a number of commands whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

In a typical configuration, a computer device comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media does not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements not only comprise those elements, but also comprise other elements that have not been explicitly listed or elements that are intrinsic to such processes, methods, merchandise, or devices. In the absence of further limitations, elements that are limited by the phrase "comprises a(n) . . . " do not exclude the existence of additional identical elements in processes, methods, merchandise, or devices that comprise said elements.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining, by a terminal, identifying information associated with a provision device, wherein the terminal obtains the identifying information associated with the provision device in response to the terminal being within a threshold proximity of the provision device or in response to the terminal being within a range of short distance communication with the provision device;
communicating, by the terminal, the identifying information to an identifying information receiver;
obtaining, by the terminal, provision information associated with the provision device, wherein the provision information is obtained as feedback from the identifying information receiver based at least in part on the identifying information, the provision information is indicative of at least one service or one product provided by the provision device, and the provision information is obtained based at least in part on a look up of a mapping of provision information to identifying information for a plurality of provision devices, the look up being based at least in part on the identifying information associated with the provision device; and
providing, by the terminal, at least a subset of the provision information associated with the provision device to a user of the terminal, wherein the providing the at least the subset of the provision information associated with the provision device to the user of the terminal comprises:
providing a user interface on the terminal, the user interface comprising a selectable element corresponding to one or more of the at least one service or one product; and
in response to selection of the selectable element, performing a payment operation by which the user provides instruction to a server for payment of the one or more of the at least one service or one product, and
wherein in response to the payment of the one or more of the at least one service or one product being processed by the server, the one or more of the at least one service or one product is obtained from the provision device.

2. The method of claim 1, further comprising:
requesting, by the terminal, the service or the product provided by the provision device, wherein the service is obtained based at least in part on the provision information associated with the provision device.

3. The method of claim 1, wherein the obtaining of the identifying information associated with the provision device comprises:
receiving a wireless signal broadcast by the provision device; and
determining the identifying information associated with the provision device based at least in part on information comprised in the wireless signal.

4. The method of claim 3, wherein the wireless signal comprises one or more of: a Bluetooth signal, an infrared signal, a WiFi signal, and/or a Near Field Communication (NFC) signal.

5. The method of claim 1, wherein the providing of at least the subset of the provision information comprises:
displaying the provision information associated with the provision device on an interface of the terminal.

6. The method of claim 5, wherein:
the provision information comprises equipment information corresponding to the provision device; and
the displaying of the provision information on the interface comprises displaying the equipment information corresponding to the provision device in information card form on the interface of the terminal.

7. The method of claim 6, wherein the displaying of the equipment information corresponding to the provision device in the information card form on the interface of the terminal comprises:
obtaining physical object information provided by the provision device based at least in part on the provision information associated with the provision device;
selecting from among pre-saved visualized card templates a visualized card template;
generating an information card based at least in part on the physical object information and the visualized card template that is selected; and
displaying the information card on the interface of the terminal.

8. The method of claim 7, wherein:
the visualized card template comprises at least one operable area; and
generating the information card comprises populating the physical object information presented in the operable area.

9. The method of claim 8, further comprising:
receiving an operation instruction input by the user to a corresponding operable area of the information card; and
in response to receiving the operation instruction, determining the physical object information corresponding to the operable area of the information card.

10. The method of claim 1, further comprising:
determining, by the terminal, operational information based at least in part on an input to the terminal and the provision information; and
communicating the operational information to the provision device, wherein the operational information corresponds to an instruction for the provision device to conduct a corresponding operation.

11. The method of claim 10, wherein the operational information comprises payment operation information relating to a physical object that is to be purchased from the provision device.

12. The method of claim 10, wherein the operational information comprises an instruction for the provision device to provide a selected physical object information.

13. The method of claim 1, further comprising:
receiving, by the terminal, service update information associated with the provision device, wherein the service update information corresponds to a change to one or more characteristics of the provision device or a product or service provided by the provision device; and
updating the obtained provision information associated with the provision device based on the service update information.

14. The method of claim 1, further comprising:
determining location information associated with the terminal;
obtaining location information associated with the provision device based at least in part on the provision information associated with the provision device; and
providing navigation information based at least in part on the location information associated with the terminal and location information associated with the provision device.

15. The method of claim 1, wherein the identifying information receiver corresponds to the provision device or a server in communication with the provision device.

16. A device, comprising:
one or more processors configured to:
obtain identifying information associated with a provision device, wherein the device obtains the identifying information associated with the provision device in response to the device being within a threshold proximity of the provision device or in response to the device being within a range of short distance communication with the provision device;
communicate the identifying information to an identifying information receiver;
obtain provision information associated with the provision device, wherein the provision information is obtained as feedback from the identifying information receiver based at least in part on the identifying information, the provision information is indicative of at least one service or one product provided by the provision device, and the provision information is obtained based at least in part on a look up of a mapping of provision information to identifying information for a plurality of provision devices, the look up being based at least in part on the identifying information associated with the provision device; and
provide at least a subset of the provision information associated with the provision device to a user of the device, wherein the providing the at least the subset of the provision information associated with the provision device to the user of the device comprises:
providing a user interface on the device, the user interface comprising a selectable element corresponding to one or more of the at least one service or one product; and
in response to selection of the selectable element, performing a payment operation by which the user provides instruction to a server for payment of the one or more of the at least one service or one product, and
wherein in response to the payment of the one or more of the at least one service or one product being processed by the server, the one or more of the at least one service or one product is obtained from the provision device; and one or more memories coupled to the one or more processors, configured to provide the one or more processors with instructions.

17. A computer program product, the computer program product being embodied in a non-transitory computer readable storage medium and comprising computer instructions for:

obtaining, by a terminal, identifying information associated with a provision device, wherein the terminal obtains the identifying information associated with the provision device in response to the terminal being within a threshold proximity of the provision device or in response to the terminal being within a range of short distance communication with the provision device;

communicating, by the terminal, the identifying information to an identifying information receiver;

obtaining, by the terminal, provision information associated with the provision device, wherein the provision information is obtained as feedback from the identifying information receiver based at least in part on the identifying information, the provision information is indicative of at least one service or one product provided by the provision device, and the provision information is obtained based at least in part on a look up of a mapping of provision information to identifying information for a plurality of provision devices, the look up being based at least in part on the identifying information associated with the provision device; and providing, by the terminal, at least a subset of the provision information associated with the provision device to a user of the terminal, wherein the providing the at least the subset of the provision information associated with the provision device to the user of the terminal comprises:

providing a user interface on the terminal, the user interface comprising a selectable element corresponding to one or more of the at least one service or one product; and in response to selection of the selectable element, performing a payment operation by which the user provides instruction to a server for payment of the one or more of the at least one service or one product, and wherein in response to the payment of the one or more of the at least one service or one product being processed by the server, the one or more of the at least one service or one product is obtained from the provision device.

18. A system, comprising:

a terminal comprising one or more processors, and one or more memories coupled to the one or more processors, configured to provide the one or more processors with instructions, the one or more processors configured to:

obtain identifying information associated with a provision device, wherein the terminal obtains the identifying information associated with the provision device in response to the terminal being within a threshold proximity of the provision device or in response to the terminal being within a range of short distance communication with the provision device;

communicate the identifying information to an identifying information receiver;

obtain provision information associated with the provision device, wherein the provision information is obtained as feedback from the identifying information receiver based on the identifying information, the provision information is indicative of at least one service or one product provided by the provision device, and the provision information is obtained based at least in part on a look up of a mapping of provision information to identifying information for a plurality of provision devices, the look up being based at least in part on the identifying information associated with the provision device; and provide at least a subset of the provision information associated with the provision device to a user of the terminal, wherein the providing the at least the subset of the provision information associated with the provision device to the user of the terminal comprises:

providing a user interface on the terminal, the user interface comprising a selectable element corresponding to one or more of the at least one service or one product; and in response to selection of the selectable element, performing a payment operation by which the user provides instruction to a server for payment of the one or more of the at least one service or one product, wherein in response to the payment of the one or more of the at least one service or one product being processed by the server, the one or more of the at least one service or one product is obtained from the provision device; and the provision device comprising one or more processors, and one or more memories coupled to the one or more processors, configured to provide the one or more processors with instructions, the one or more processors configured to:

communicate the identifying information associated with the provision device;

obtain operational information generated by the terminal, wherein the operational information is generated based at least in part on the provision information, wherein the provision information is indicative of the at least one service or one product provided by the provision device; and perform a corresponding operation according to the operational information.

\* \* \* \* \*